(12) United States Patent
Matthews et al.

(10) Patent No.: US 10,868,768 B1
(45) Date of Patent: Dec. 15, 2020

(54) MULTI-DESTINATION TRAFFIC HANDLING OPTIMIZATIONS IN A NETWORK DEVICE

(71) Applicant: Innovium, Inc., San Jose, CA (US)

(72) Inventors: William Brad Matthews, San Jose, CA (US); Puneet Agarwal, Cupertino, CA (US); Bruce Hui Kwan, Sunnyvale, CA (US); Ajit Kumar Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 93 days.

(21) Appl. No.: 16/029,392

(22) Filed: Jul. 6, 2018

Related U.S. Application Data

(60) Provisional application No. 62/665,955, filed on May 2, 2018.

(51) Int. Cl.
| | |
|---|---|
| *H04L 12/26* | (2006.01) |
| *H04L 12/863* | (2013.01) |
| *H04L 12/761* | (2013.01) |
| *H04L 12/835* | (2013.01) |
| *H04L 12/865* | (2013.01) |
| *H04L 12/707* | (2013.01) |

(52) U.S. Cl.
CPC .......... *H04L 47/6255* (2013.01); *H04L 45/16* (2013.01); *H04L 45/24* (2013.01); *H04L 47/30* (2013.01); *H04L 47/6275* (2013.01)

(58) Field of Classification Search
CPC . H04L 49/103; H04L 49/101; H04L 49/3027; H04L 49/254; H04L 49/20
See application file for complete search history.

(56) References Cited

U.S. PATENT DOCUMENTS

| 8,520,522 | B1* | 8/2013 | Goldman ................ H04L 47/26 370/235 |
| 2003/0095558 | A1* | 5/2003 | Chung .................. H04L 47/623 370/417 |
| 2003/0120884 | A1 | 6/2003 | Koob et al. |

(Continued)

OTHER PUBLICATIONS

United States Patent and Trademark Office, U.S. Appl. No. 16/029,441, Notice of Allowance dated Aug. 21, 2019.

*Primary Examiner* — Romani Ohri
(74) *Attorney, Agent, or Firm* — Wong & Rees LLP; Karl T. Rees

(57) ABSTRACT

When a measure of buffer space queued for garbage collection in a network device grows beyond a certain threshold, one or more actions are taken to decreasing an enqueue rate of certain classes of traffic, such as of multicast traffic, whose reception may have caused and/or be likely to exacerbate garbage-collection-related performance issues. When the amount of buffer space queued for garbage collection shrinks to an acceptable level, these one or more actions may be reversed. In an embodiment, to more optimally handle multi-destination traffic, queue admission control logic for high-priority multi-destination data units, such as mirrored traffic, may be performed for each destination of the data units prior to linking the data units to a replication queue. If a high-priority multi-destination data unit is admitted to any queue, the high-priority multi-destination data unit can no longer be dropped, and is linked to a replication queue for replication.

24 Claims, 10 Drawing Sheets

(56) References Cited

U.S. PATENT DOCUMENTS

| | | | | |
|---|---|---|---|---|
| 2005/0025140 A1* | 2/2005 | Deforche | ................ | H04L 47/34 |
| | | | | 370/363 |
| 2005/0100020 A1* | 5/2005 | Hata | ....................... | H04L 47/10 |
| | | | | 370/395.21 |
| 2015/0356007 A1* | 12/2015 | Bacon | ................ | G06F 12/0238 |
| | | | | 711/159 |
| 2017/0344473 A1* | 11/2017 | Gidra | ................... | G06F 12/0261 |
| 2019/0265909 A1* | 8/2019 | Frolikov | ............... | G06F 3/0659 |

* cited by examiner 10,868,768 B1

MULTI-DESTINATION TRAFFIC HANDLING OPTIMIZATIONS IN A NETWORK DEVICE

PRIORITY CLAIM

This application claims benefit under 35 U.S.C. § 119(e) of Provisional Application No. 62/665,955, filed May 2, 2018, the entire contents of which is hereby incorporated by reference as if fully set forth herein.

TECHNICAL FIELD

Embodiments relate generally to handling network traffic, and, more specifically, to techniques for improving the handling of multi-destination traffic within certain network devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

In these and other contexts, a network device or other computing device often needs to temporarily store data in one or more memories or other storage media until resources become available to process the data. The storage media in which such data is temporarily stored is often logically and/or physically divided into discrete regions or sections referred to as data buffers (or, simply, "buffers"), and the act of temporarily storing data in these locations is generally referred to as "buffering." Constructs referred to as queues are utilized to manage the order in which the data is retrieved from the buffers and processed by the relevant component(s) of the network device.

The rules and logic utilized to determine how data is buffered and queued is a significant system design concern having a variety of technical ramifications, including without limitation the amount of storage media needed to implement buffers and queues, the speed of that media, how that media is interconnected with other system components, and/or the arrangement of the processing logic of the system.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
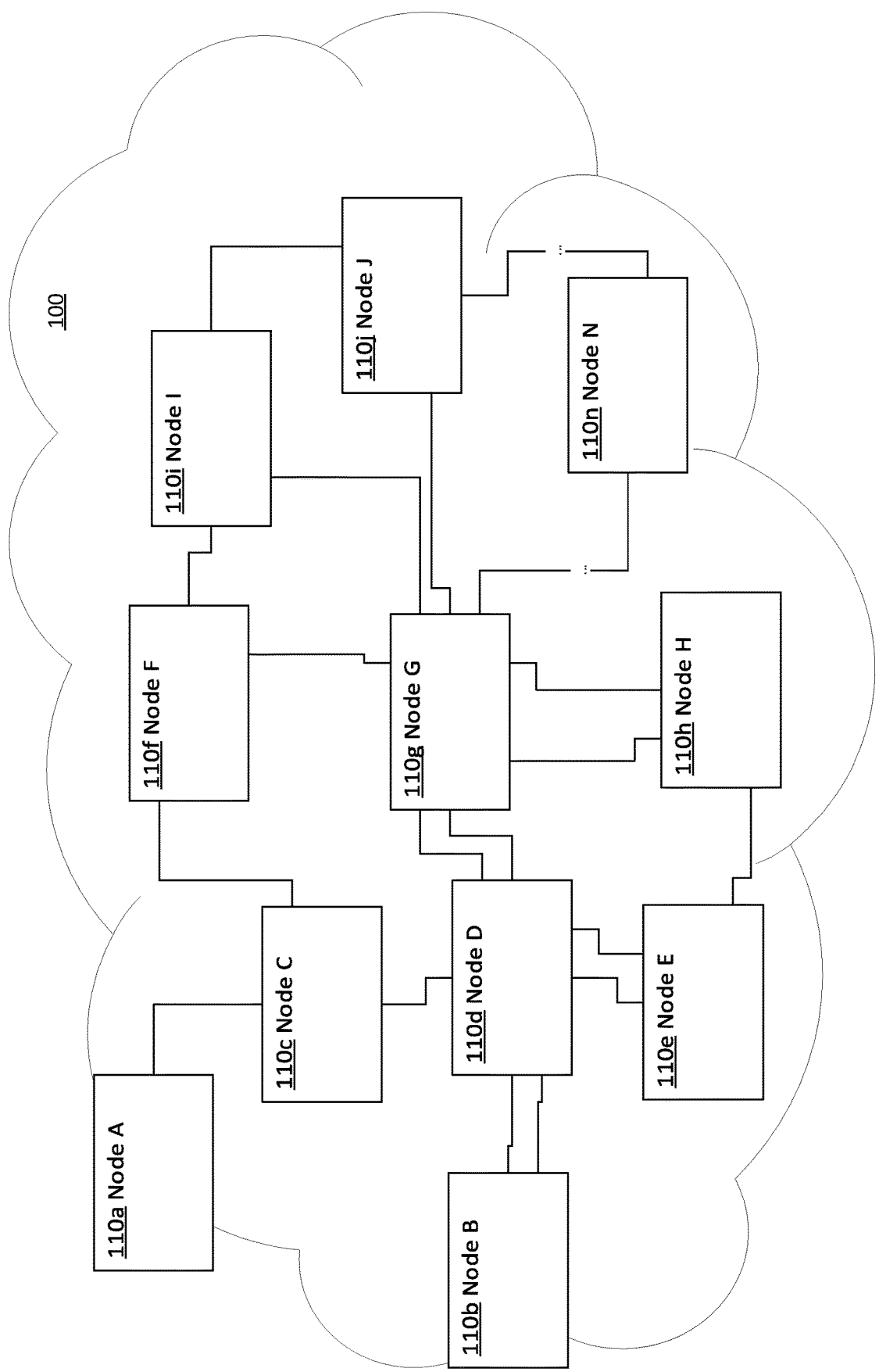
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
  2.1. Data Units
  2.2. Traffic Manager and Packet Processing
  2.3. Buffers
  2.4. Egress queues
  2.5. Metadata
  2.6. Buffer Accounting
  2.7. Garbage Collection
  2.8. Replication Queues
  2.9. Enqueue Rate Adjuster
  2.10. High-Priority Multi-Destination Replication
  2.11. Miscellaneous
3.0. Functional Overview
  3.1. Buffering Packet Data
  3.2. Responding to a Drop Event
  3.3. Enqueuing Data Units
  3.4. Enqueue Rate Adjustment
  3.5. Optimizing Handling of High-Priority Multi-Destination Traffic
4.0. Example Embodiments
5.0. Example Implementing System
  5.1. Network Packets
  5.2. Network Paths
  5.3. Network Device
  5.4. Ports
  5.5. Packet Processors
  5.6. Buffers
  5.7. Queues
  5.8. Egress Traffic Management
  5.9. Arbitrator
  5.10. Accounting Mechanisms
  5.11. Garbage Collectors
  5.12. Miscellaneous
6.0. Implementation Mechanism—Hardware Overview
7.0. Extensions and Alternatives

1.0. General Overview

Approaches, techniques, and mechanisms are disclosed for improved handling of multi-destination traffic in certain network devices, such as in certain switches or routers. Data units are temporarily stored in buffers as they are received by the network device. If possible, the buffered data units are then linked to queues (i.e. "enqueued") from which the data units are eventually processed by one or more packet processors, and typically forwarded to one or more destinations.

The logic for enqueueing a data unit may include queue admission control logic that verifies that the enqueueing of a certain data unit in a certain egress queue is permitted in accordance with any relevant policies such as flow control and/or queue size restrictions. Data units that fail this or any other verification process may be dropped instead of linked to a queue.

In an embodiment, the buffer space consumed by a data unit is, at least some of the time, not freed immediately when that data unit is dropped or otherwise disposed of. Instead, the buffer space is queued for processing by a garbage collection component, which frees the space as resources become available. However, if the total amount of buffer space queued for garbage collection grows too large—e.g. as a result of resources being unavailable for garbage collection and/or having recently received a large amount of traffic that cannot be enqueued—performance of the network device may suffer. For instance, the device may quickly exhaust the available buffer space for newly arriving data units and increasingly drop these new data units instead.

In an embodiment, among other effects, these and/or other performance issues may be addressed by taking one or more actions when the amount of buffer space queued for garbage collection grows beyond a certain threshold. The one or more actions may include, for instance, decreasing an enqueue rate of certain classes of traffic, such as of multicast traffic, whose reception may have caused and/or be likely to exacerbate the performance issues. More generally, the effect of the one or more actions may be to temporarily reduce the flow of multicast traffic and/or other types of traffic. When the amount of buffer space queued for garbage collection shrinks to an acceptable level, these one or more actions may be reversed.

A network device may receive multi-destination traffic, comprising data units that are to be replicated and forwarded to multiple destinations associated with different queues. In an embodiment, prior to being linked to the queues that are processed by the one or more packet processors, which are also referred to as "egress queues" for purposes of differentiation, multi-destination data units are first linked to one or more special queues, referred to herein as "replication queues." From these replication queues, a replication component generates multiple copies of a multi-destination data unit, or of linking data associated therewith, and links these copies to different egress queues associated with the different destinations of the multi-destination data unit.

In an embodiment, to more optimally handle multi-destination traffic, a network device may process low-priority multi-destination traffic differently than high-priority multi-destination traffic. For instance, in some embodiments, multicast data units may generally be considered low-priority multi-destination traffic, whereas a mirrored unicast data unit may be considered high-priority multi-destination traffic. The queue admission control logic for high-priority multi-destination data units may be performed, for each destination of those data units, prior to linking the data units to a replication queue. If a high-priority multi-destination data unit is admitted to any queue, the high-priority multi-destination data unit can no longer be dropped, and is linked to a replication queue for replication. By contrast, the queue admission control logic for low-priority multi-destination data units is performed for each of its copies as the low-priority multi-destination data unit leaves the replication queue.

In other aspects, the inventive subject matter encompasses computer apparatuses and/or computer-readable media configured to carry out the foregoing techniques.

2.0. Structural Overview

Figure 3:
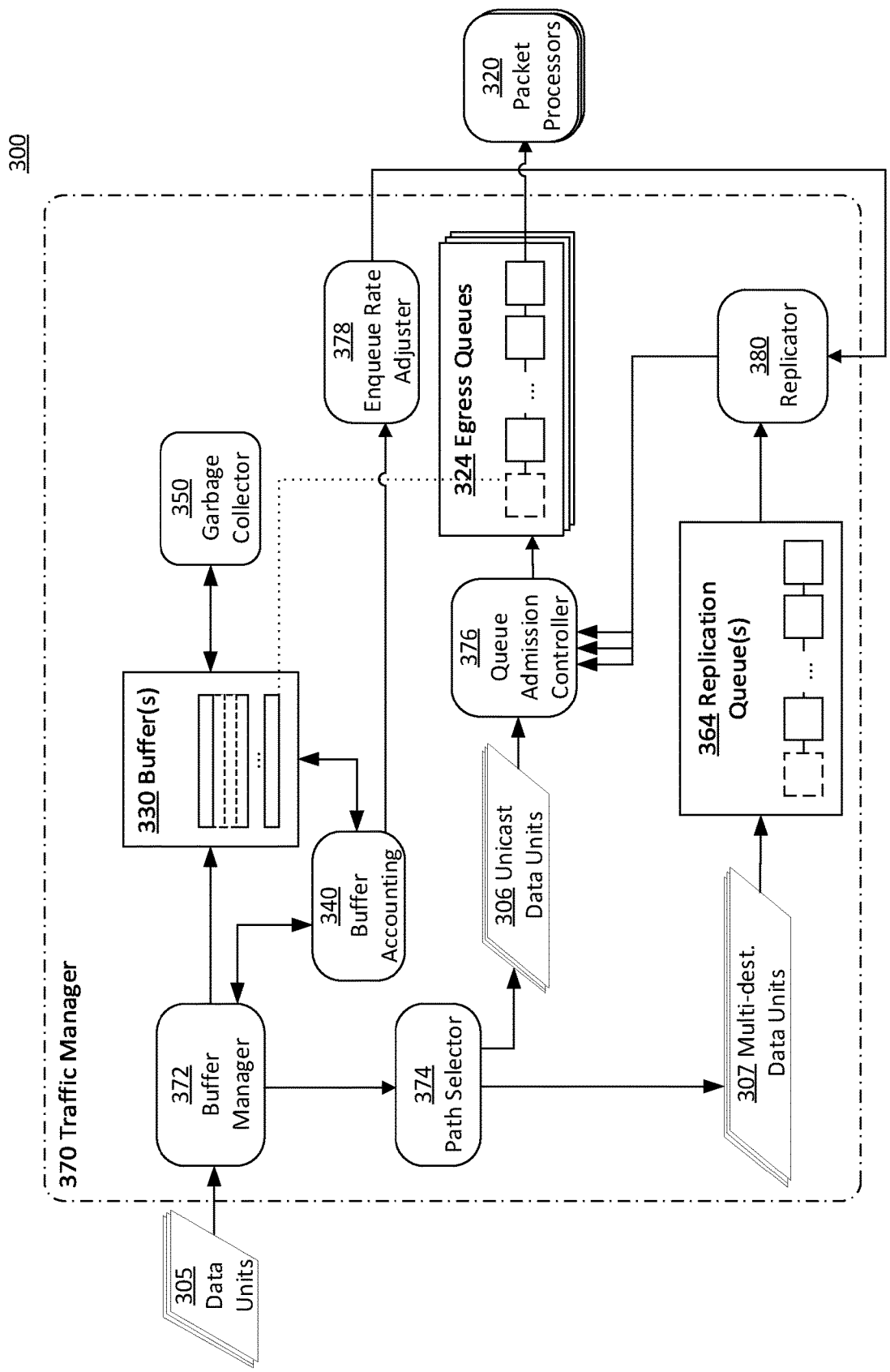
FIG. 3 is an illustrative view of various aspects of an example system in which techniques described herein may be practiced.

FIG. 3 is an illustrative view of various aspects of an example system 300 in which techniques described herein may be practiced, according to an embodiment. System 300 is implemented by a computing device comprising any combination of hardware and software configured to implement the various logical components described herein, including components 320-370. For example, system 300 may be a single networking computing device, such as a router or switch, in which some or all of the processing components described herein are implemented in application-specific integrated circuits (ASICs), field programmable gate arrays (FPGAs), or other integrated circuit(s). As another example, system 300 may include one or more memories storing instructions for implementing various components described herein, one or more hardware processors configured to execute the instructions stored in the one or more memories, and various data repositories in the one or more memories for storing certain data structures utilized and manipulated by the various components.

2.1. Data Units

System 300 is configured to receive, buffer, and process network traffic communicated in the form of data units 305. Data units 305 may be of any suitable structure type, though in an embodiment, data units 305 are TCP/IP packets. Data units 305 may be received at system 300 via, for example, one or more network communication interfaces coupled to a network, over which they were sent from another device.

A data unit 305 may comprise a set of subunits, also referred to as data unit portions. For instance, in an embodiment where the data unit 305 is a packet, the data units 305 may be composed of distinct cells or frames. There may be any number of distinct portions in a data unit 305. The first portion in the data unit 305 may be referred to as the "start-of-packet," or "SOP," and the last portion is referred to as the "end-of-packet," or "EOP." The first one or more subunits generally carry header information for the data unit 305, such as fields for the source address, destination address, and other metadata. Any remaining space available within the first one or more subunits may be filled with the beginning of the "payload" of the data unit 305—i.e. the principal data which the data unit 305 is intended to communicate. The remaining cells generally carry the remainder of the payload of the data unit 305.

In an embodiment, each of the subunits may be received at system 300 at separate times, and may in some embodiments even be received out of order. Data unit portions may be received for multiple packets concurrently. The portions of a given data unit 305 may subsequently be associated together using any of a variety of mechanisms, such as by an identifier or sequence number within the portion, a context in which they are received, and so forth.

In some embodiments, some components of system 300 may receive and process different portions of a data unit 305 at different times. For instance, a packet processor may process and forward a first portion of a data unit 305 in a first time slot, a second portion of the data unit 305 in a following time slot, and so forth until all portions of the data unit 305 have been processed and forwarded. Likewise, a buffer manager may receive and buffer a first portion of a data unit 305 in a first time slot, a second portion of the data unit 305 in a following time slot, and so forth until all portions of the data unit 305 have been received and buffered. In view of such embodiments, and for simplification of the disclosure, unless otherwise stated, the receiving or processing of a data unit should be interpreted as including not only receiving or processing the whole data unit at once, but also collectively receiving or processing the individual portions of that data unit over a period of time, depending on the embodiment.

2.2. Traffic Manager and Packet Processing

Once received at system 300, the data units 305 are eventually forwarded to a traffic management component 370 of system 300, referred to herein as a traffic manager 370. Prior to receipt at the traffic manager 370, the data units 305 may optionally be routed through and/or processed by a number of other components of system 300, such as ingress processors, arbitration components, egress processors, other traffic managers, and so forth.

Traffic manager 370 is any component configured to direct the flow of data units 305 to one or more packet processors 320. There may be any number of traffic managers 370 within system 300, each coupled to its own instances of the other components depicted in FIG. 3.

A packet processor 320 may be configured to perform any of a variety tasks with respect to a data unit 305, such as, without limitation, selecting a path for the data unit 305, forwarding the data unit 305 out an egress communication interface of system 300 to another device, forwarding the data unit 305 to another packet processor 320 or traffic manager 370 of the system 300, manipulating the data unit 305, replicating the data unit 305, collecting statistics related to the data unit 305, performing debugging operations based on the data unit 305, and so forth. Traffic manager 370 is configured to utilize metadata within the data unit 305, such as header data, and/or contextual data to determine exactly which packet processor 320 should handle which data unit 305.

While the term "packet" is used as a descriptor for illustrative purposes, a packet processor 320 may in fact perform processing on any type of data unit 305 at any suitable level. For instance, in an embodiment a packet processor 320 processes TCP/IP packets on a cell-by-cell basis.

2.3. Buffers

The packet processor(s) 320 may be incapable of concurrently processing all of the data units 305, or portions thereof, that may arrive at traffic manager 370 at a given moment of time. Hence, traffic manager 370 may temporarily store data units 305, or portions thereof, in a set of buffers 330. The set of buffers 330 may include one or more physical memory banks or other distinct units of memory.

In an embodiment, each of the memory banks upon which the buffers 330 are implemented may be accessed for reading or writing only a limited number of times in a given time slot (e.g. a clock-cycle). For instance, each bank may be implemented using a single-ported Static Random Access Memory (SRAM), which supports relatively high-frequency clock cycles at the expense of limiting access to only a single read or write operation per clock cycle. In other embodiments, double-ported or other multi-ported memories may be utilized.

However, whatever memory limitations may exist, the traffic manager 370 is configured to schedule buffer read and write operations so as to ensure that no conflict occurs. This may entail, for instance, selecting the location to store a given data unit 305 or data unit portion in such a manner as to avoid assigning the data unit 305 or data unit portion to a memory bank that cannot be accessed in the appropriate time slot.

Buffers 330 may be divided into addressable locations referred to as entries. A data unit 305 may be stored in one or more entries. In an embodiment, the contents of each portion of a data unit 305 (e.g. each cell) is stored in a separate entry, which is assigned by buffer management logic 372 in traffic manager 370. The buffer manager 372 keeps track of which entries are used to store data for data units 305, so as to ensure that newly buffered data units 305 do not overwrite data units 305 that still need to be processed.

One mechanism for doing so is a "free" list, comprising a list of entries that are currently available to store new data units. Entries initially begin in the free list, and are removed from the free list when they are assigned to store data for a newly received data unit. Garbage collection logic within a garbage collector 350 returns the entries to the free list when the data stored therein has been dropped or otherwise disposed of.

In embodiments where data units 305 are stored across multiple buffer entries, traffic manager 370 may store linking data that links these buffer entries together, so that the data units 305 may subsequently be reconstructed. For example, the linking data for a data unit 305 may include intra-packet linking data, which defines one or more chains of buffer entries that store data for the data unit. Each link in a chain corresponds to a different buffer entry in which data for the data unit may be found, and each link may further point to a subsequent link in the chain. There may be multiple chains for a data unit. For instance, there may be a different chain for each distinct buffer memory bank in which data for the data unit is found. In yet other embodiments, the intra-packet linking data may take other suitable forms. The linking data may further include inter-packet linking data that links data units within a queue 324, as described subsequently.

In an embodiment, the traffic manager 370 may further implement one or more ingress checks on a data unit 305 to determine whether to allow the data unit 305 to be buffered, or to drop the data unit 305 without buffering the data unit 305. These ingress checks may include, for instance, verifications that buffering the data unit 305 would not exceed any quotas on the amount of space that is utilized within the buffer to store data associated with various attributes that the data unit 305 may have. For instance, there may be restrictions on the amount of data received over a certain source port that may be buffered at any given time, or the amount of data in a certain traffic class, or the amount of data belonging to a certain traffic flow, and so forth. In an embodiment, these checks may be performed on an ongoing basis as data unit portions are received, such that a data unit 305 may be dropped mid-stream, even after some of that data unit 305 is already buffered.

2.4. Egress Queues

To determine the order in which traffic manager 370 releases data units 305 for processing by packet processors 320, traffic manager 370 includes queueing logic that arranges data units 305 or data unit portions, or the buffer entries that store them, into queues 324. Each queue 324 comprises an ordered set of nodes, with each node referencing a data unit 305 or data unit portion by an appropriate identifier or buffer entry address. When a data unit 305, or portion thereof, is buffered, the data unit 305 or data unit portion is also added as the tail node of the queue 324, and then gradually moved to the head of the queue 324 as other nodes arrive and depart from the queue 324 over time.

Any sort of queuing logic may be utilized to determine the next node that should be processed, though in many embodiments the queue is a first-in-first-out (FIFO) queue. In a FIFO-based implementation, the head node, which is typically the node that has been in the queue 324 the longest, is the next node to be processed. Thus, when a node arrives at the head of the queue 324, the queueing logic will, at the next appointed time for releasing a node from the queue 324, release the corresponding data unit 305 or data unit portion to a corresponding packet processor 320.

Queue Assignment

There may be many queues 324, and each packet processor 320 may be associated with one or more distinct queues 324. A path selector 374 assigns each data unit 305 to one or more queues 324 using path selection logic. For instance, the path selector 374 may determine that a certain data unit 305 needs to be forwarded along a particular path, and that a certain queue 324 is associated with an egress port that forwards data to a next hop in that path. The path selector 374 may thus assign the certain data unit 305 to that queue 324. Or, the path selector 374 may determine that a certain policy dictates that a certain data unit 305 be forwarded to a certain packet processor 320 for additional processing. The path selector 374 may thus assign the data unit 305 to a queue 324 associated with that certain packet processor 320.

In an embodiment, queue assignments are made on a data-unit-by-data-unit basis, such that all portions of a given data unit 305 are assigned to the same queue 324. In an embodiment, queue assignments are made based on data unit metadata. This metadata may include, for example, header data such as source and destination addresses, source and destination ports, packet types, protocol identifiers, packet sequence numbers, quality-of-service classes, and so forth. Many queue assignment techniques are known, and this application is not specific to any particular queue assignment technique.

Queue Admission Control

Traffic manager 370 may further include queue admission control logic 376, collectively referred to as queue admission controller 376. The queue admission controller 376 is configured to determine whether to "admit" a given data unit 305 into a given queue 324 to which the data unit 305 has been assigned. Stated in another manner, the queue admission controller 376 determines which of the buffered data units 305 to "enqueue."

To determine whether to enqueue a data unit 305, queue admission controller 376 may implement one or more egress checks. The one or more egress checks verify that the given data unit 305 passes one or more admission rules or policies for the queue 324 to which the data unit 305 has been assigned. These egress checks may include, for example, verifications that enqueueing the data unit 305 would not exceed any restrictions on the size of the queue 324. For instance, there may be a global or queue-specific limitation on the number of nodes or data unit portions within a queue 324. If this number is exceeded, no further data may enter the queue 324 until the size of the queue 324 has shrunk to an acceptable size. Similar limitations may apply to the aggregate size of a group of queues 324.

As another example, the ingress checks may include verifications that enqueueing the data unit 305 would not exceed any quotas on the amount of buffer space that is utilized to store data, linked to the queue 324, that is associated with various attributes that the data unit 305 may have. For instance, there may be restrictions on the amount of data received over a certain source port that may be enqueued within a queue 324, or group of queues 324, at any given time. Or, there may be restrictions on the amount of data in a certain traffic class, the amount of data belonging to a certain traffic flow, and so forth.

As yet another example of an egress check, the queue admission controller 376 may be configured to perform a CRC check based on CRC information in the EOP. The CRC check indicates whether data from the data unit 305 has become corrupted or missing at some point since it was transmitted.

In an embodiment, egress checks may be performed on an ongoing basis as data unit portions of certain types of data units 305 are received, such that a data unit 305 may fail an egress check mid-stream, before the data unit 305 has been completely buffered. For instance, the size of a data unit 305 may not be known when it is first received. Some or all of the egress checks may be performed as each data unit portion is buffered. Initially, the data unit portions received may fit into the assigned queue 324, and thus the data unit 305 may pass the egress checks. At some point, the size of the data unit 305 may grow such that the data unit 305 cannot be enqueued. When this occurs, the data unit 305 is dropped, and subsequently received data unit portions need not be buffered.

When a data unit 305 is enqueued, the data unit 305 is said to be "linked" to its assigned queue 324. Once a data unit 305 has been verified to pass all of the relevant egress checks for a queue 324, the queue admission controller 376, or another component of traffic manager 370, may link that data unit 305 to the queue 324 by linking metadata describing the data unit 305 to the queue 324 (e.g. by storing such metadata in an inter-packet memory).

In an embodiment, queues 324 are bound to ports. Access to egress packet processing bandwidth is arbitrated via a port scheduler (not depicted). When it comes time for another data unit portion (e.g. cell) to depart from the traffic manager 370, a port is selected by the port scheduler. A queue 324 bound to the port is selected by a queue scheduler (if no data units 305 are active for the port). If a data unit 305 (e.g. packet) is already actively being transmitted for the port, then the next data unit portion in the data unit 305 is sent to the corresponding egress packet processor 320. If no data unit 305 is active for the port, the first data unit portion for the selected queue 324 is sent to the corresponding egress packet processor 320 for the queue 324. In yet other embodiments, any other suitable technique for dequeue data units 305 from a queue 324 may be utilized.

2.5. Metadata

System 300 stores various metadata for each data unit 305. This metadata may be stored in any suitable structure within one or more memories. For example, in an embodiment, some or all of the metadata is initially stored in a "receive context" structure within a suitably fast memory until the entire data unit 305 has been received (e.g. until an "end-of-packet" cell has been buffered). For instance, the receive context may be stored in "flops", which does not have access restrictions. Once the entire data unit 305 has been received, some or all of the metadata may be shifted to another memory, typically slower and/or more restrictive than that used to store the receive context structure, such as an "inter-packet" memory comprising one or more memory banks of entries for storing packet linking metadata. Generally, the receive context is used to collect all the information needed to dequeue a packet prior to storage in the inter-packet memory.

In yet other embodiments, the metadata may be written directly to the inter-packet memory without a receive context.

In some embodiments, different portions of the metadata may be generated at different times. For instance, metadata such as a sequence number, a source port identifier, and a priority set identifier may be generated as soon as the data unit header has been read from the start of the data unit 305. This metadata may be generated by the traffic manager 370, or by another component of system 300 deployed in front of the traffic manager 370. Subsequently, as other information about the data unit 305 is determined, the information may be added to the metadata, using the sequence number or another identifier for lookup.

When the data unit 305 is linked to a queue 324, additional metadata may be generated and stored for the data unit. Such information may include, for instance, a queue identifier linking the data unit 305 to a queue 324 to which the data unit 305 is assigned. In an embodiment, the queue linking data may be stored in yet another memory known as the "inter-packet memory."

The metadata may further include addresses of certain data unit portions within the buffer set 330. For instance, in an embodiment, the traffic manager may write the address of a "head" data unit portion in a buffer. This address may subsequently be used to determine where to start retrieving data unit portions for the data unit 305 when transmitting or otherwise processing the data unit 305.

The metadata may of course include a variety of other information, depending on the embodiment, such as a count of data unit portions received so far, a tail address for the data unit 305, other data unit header information, and so forth.

2.6. Buffer Accounting

In some embodiments, system 300 further comprises a buffer accounting mechanism 340. In an embodiment, such an accounting mechanism 340 is included in or coupled to traffic manager 340. Buffer accounting mechanism 340 is configured to, among other tasks, monitor the use of buffers in buffer set 330 and generate buffer count information based thereon. The buffer count information may be stored in any suitable storage location, and/or communicated to traffic manager 370 and/or other components periodically or upon request.

Accounting mechanism 340 maintains a count that indicates the number of buffer entries and/or amount of buffer space utilized by or available to each of a number of defined logical or physical "entities." The entities may include, without limitation, constructs such as ingress ports, egress ports, queues 324, priority sets, and/or traffic classes. The entities may, for example, correspond to specific values in the data unit metadata, such as an identifier field for an ingress or egress port, ingress or egress queue, buffer partition, queue group identifier, etc.

The buffer count information generated by buffer accounting mechanism 340 may serve any of a variety of purposes, such as, without limitation, indicating when a queue 324 or other entity's allotment of buffer space in buffer set 330 has been exhausted, or when the buffer set 330 is experiencing congestion related to that entity. Based on the buffer count information, traffic manager 370 or another component of system 300 may be configured to perform various actions, such as, without limitation, discarding ("dropping") certain sets of data units 305 (as opposed to buffering the data units 305 and sending them through queues 324), enabling rate control with respect to certain sets of data units 305, performing statistical or debugging operations, and so forth.

In some embodiments, to reduce the expense of the accounting mechanism 340, the accounting mechanism 340 may only count information at intermittent times (e.g. once every ten clock cycles, once every twenty clock cycles, etc.). The accounting mechanism 340 may, for instance, determine and report updated buffer count information for only a small subset of the entities each clock cycle, with the subset being chosen using a round robin approach and/or based on which entities exhibit a high level of recent activity. Alternatively, or additionally, the accounting mechanism 340 may resolve only an approximate utilization for an entity. A variety of suitable accounting mechanisms 340 exist in which resource utilization, such as per-entity buffer utilization, is tracked on a delayed, staggered, or otherwise approximate basis instead of in real-time.

2.7. Garbage Collection

System 300 further comprises a garbage collector 350, which may be included in, or separate from, the traffic manager 370. Garbage collector 350 implements logic for identifying buffer entries that are no longer in use (i.e. that have been "freed"). Buffer entries may have become freed for any of a number of reasons. For instance, the buffer entries may have been used to store data units 305 that have been dropped, or that have already processed. For these buffer entries that are no longer in use, garbage collector 350 may perform various actions such as adding the entry back to a "free" list of entries that are available for storing newly received data units, updating buffer count information, reading intra-packet linking data associated therewith so as to locate the next buffer entry in a chain of buffer entries that need to be freed, and so forth.

Garbage collector 350 typically executes at a lower-priority with respect to the resources of system 300, meaning that garbage collector 350 is typically configured to run "in the background" when memory I/O accesses and/or limited resources are not being consumed for other purposes. For example, a particular memory bank used to store the linking data for a particular buffer entry may be limited to only one I/O access per clock cycle. If that memory bank is currently being written to or read by the traffic manager 370, and if the garbage collector 350 needs to access the linking data before freeing the entry, garbage collector 350 may not be able to "free" that entry until the traffic manager 370 is done writing or reading the memory bank. Hence, system 300 may schedule garbage collection tasks around other memory accesses by the traffic manager 370, packet processor(s) 320, and/or other components.

In these and potentially other contexts, garbage collector 350 is therefore unable to immediately free some or all of the buffer entries consumed by a data unit 305 immediately after the data unit 305 is dropped or otherwise disposed of. Therefore, at any given time, a number of buffer entries may store data for data units that have been dropped or are otherwise no longer needed. Each of these buffer entries is considered to be in a garbage collection list, where they await processing by garbage collector 350. There may be any number of garbage collection lists of varying types.

The techniques described herein are agnostic as to the manner in which a garbage collector 350 frees buffer entries that are considered to be in a garbage collection list. However, in at least one embodiment, additional advantages may be realized when the described techniques are utilized in conjunction with the example garbage collection techniques described in U.S. patent application Ser. No. 16/029,441, entitled "HIGH-PERFORMANCE GARBAGE COLLECTION IN A NETWORK DEVICE," by Matthews et al., filed on the same date herewith, the entire contents of which are hereby incorporated by reference for all purposes as if set forth in their entirety.

2.8. Replication Queues

Data units 305 may include multiple types of data units. One type of data unit is a unicast data unit 306, while another type of data unit 305 is a multi-destination data unit 307. Unicast data units 306 are data units that are being forwarded to a single destination, whereas each multi-destination data unit 307 is forwarded to multiple destinations.

An example of a multi-destination data unit 307 is a multicast data unit, which specifies a target address (i.e. has a destination address field) that is associated with multiple devices. For IPv4 addresses, an address may be a multicast address, for example, if its leading bits are 1110 (corresponding to the range of addresses 224.0.0.0-239.255.255.255). Of course, depending on the protocol and embodiment, there may be other ways to specify multicast addresses, and yet other ways to specify multiple addresses other than specifying a multicast address.

In some embodiments, simply specifying multiple addresses does not guarantee that system 300 will treat data unit 305 as a multi-destination data unit 307. For instance, a data unit 305 may target multiple addresses in a same subnet or other address grouping whose next hop proceeds from a same port of system 300. System 300 may thus, in an embodiment, treat the data unit 305 as a unicast data unit 306 destined for that port.

Furthermore, the fact that a data unit 305 specifies a unicast address does not necessarily mean that system 300 will treat the data unit as a unicast data unit 306. For instance, depending on the forwarding logic of the implementing device, data units 305 that specify certain unicast addresses and/or have other characteristics of interest, may be replicated and sent to multiple destinations. For instance, in an embodiment, multi-destination data units 307 may include mirrored unicast data units and unicast data units that are replicated to internal ports, such as to a central processor unit port, a recirculation port, etc. Such ports may also be logical in nature.

The handling of multi-destination data units 307 requires an additional processing step before the multi-destination data units 307 can be enqueued. Specifically, either a copy of the multi-destination data unit 307 must be generated for each egress queue 324 to which the multi-destination data unit 307 is to be linked, or at least a copy of the linking data for the multi-destination data unit 307 must be generated for each egress queue 324 to which the multi-destination data unit 307 is to be linked. In the latter case, only a single copy of the multi-destination data unit 307 is stored in buffers 330. However, there are multiple copies of multi-destination data unit 307, each linking the buffered multi-destination data unit 307 to a different queue 324.

In an embodiment, the maximum number of enqueues supported by queues 324 in a given time slot (e.g. because of limitations on the number of memory accesses in that time slot) may be fixed. Similarly, the maximum number of copies that may be generated in a given time slot may be fixed. Meanwhile, the number of possible destinations for multi-destination data units may easily exceed either of these limits. Even if these limits are not exceeded, immediately devoting resources to the replication and enqueueing of certain multi-destination traffic may come at the cost of delaying or even dropping more important traffic.

To this end, system 300 further includes one or more replication queues 364. When path selector 374 determines that a data unit 305 is a multi-destination data unit 307, the traffic manager 370 is configured to link that data unit 307 to one or more of the replication queues 364 instead of directly to an egress queue 324. For instance, the traffic manager 370 may store metadata for the data unit 307 in a replication buffer, and then link that metadata to a replication queue 364. There may be any number of replication queues 364, though in an embodiment each source port or source queue has its own set of one or more replication queues 364.

The mechanics of a replication queue 364 are similar to an egress queue 324. The data unit 307 waits until the data unit 307 is at the head of its replication queue 364. In an embodiment, a replication scheduler may optionally schedule the dequeuing of data units 307 from replication queues 364, such that certain queues 364 and/or certain "high-priority" subsets of data units 307 are replicated more quickly than others. For instance, a mirrored unicast data unit 307 may be moved through its replication queue 364 faster than a multicast data unit 307 is moved through its replication queue 364.

When a data unit 307 reaches the head of its replication queue 364, at a time when resources for replicating and enqueuing data unit 307 become available, forwarding logic coupled to the replication queue 364 identifies each destination queue 324 for the data unit 307, using address information, rules, and/or policies applied to attributes of the data unit 307. Traffic manager 370 then attempts to enqueue the data unit 307 into each destination queue 324.

Enqueueing of a data unit 307 generally involves replication of the data unit 307, admission control checks for each destination queue 324, and linking copies of the data unit 307 to any queue 324 to which it is admitted. For example, replication logic 380, also referred to as replicator 380, may generate copies of the data unit 307, or its metadata, for each of these destination queues 324. As with the unicast data units 306, queue admission controller 376 then determines, for each destination queue 324, whether the data unit 307 may be admitted to the queue 324. As permitted, queue admission controller 376 then links each admitted copy to its associated egress queue 324. Alternatively, admission control may be performed replication, so that copies are generated only for queues to which data unit 307 is admitted.

From this point, each admitted copy is processed in the same manner as any other enqueued data unit 305. If no copies are admitted, the data unit 307 is instead added to a garbage collection list.

In an embodiment, the enqueue operation for multiple destination data unit 307 must be attempted separately for each destination queue 324. As a consequence, whereas the enqueueing of a unicast data unit 306 requires only a single operation that is performed in a single time slot (e.g. clock cycle), the enqueueing of multiple destination data unit 307 may require an unpredictable number of time slots.

Just as with any other queue or buffered data, system 300 may place various limitations on the amount of space that may be utilized by replication queues 364 or any associated replication buffers. When data of a certain attribute consumes more than an allotted amount of space within the replication queues 364 or its associated buffers, multiple destination data units 307 that have that attribute may be dropped instead of linked to a replication queue 364. Moreover, there may be absolute limits on the total amount of space consumed for replication queues 364, regardless of any associated attributes. Hence, for example, queue admission control logic associated with a replication queue 364 may begin dropping data units 307 once that replication queue 364 reaches a certain size. As with any other data unit 305, once a multi-destination data unit 307 is dropped, the data buffered in buffers 330 may thus be queued for garbage collection.

2.9. Enqueue Rate Adjuster

As mentioned, there may be a limited number of enqueues into egress queues 324 available per time slot. In any given time slot, there may be both unicast data units 306 and replicated data units 307 available for enqueue. There are a number of strategies available for deciding which of these data units 306 and 307 to enqueue in a given time slot. For instance, in an embodiment, unicast data units 306 may always take precedence over replicated data units 307, thus expediting the processing of the unicast data units 306 relative to the multi-destination data units 307 in the replication queues 364. In another embodiment, either or both of unicast data units 306 and replicated data units may be guaranteed a certain number of enqueues. If the guaranteed number of enqueues is not needed for one type of data unit, the other remaining enqueues may optionally be given to the other type of data unit. In yet another embodiment, enqueues are allocated on a first-come-first-serve basis, such that the oldest data unit 305 is always enqueued.

In an embodiment, traffic manager 370 is configured to, under at least certain circumstances, absolutely limit the rate at which replicated data units 307 are enqueued into egress queues 324. For instance, traffic manager 370 may be configured to only enqueue a certain number (e.g. one, two, etc.) of replicated data units 307 per time slot. Such an absolute limitation may apply even if additional enqueues are available in the time slot.

In an embodiment, an enqueue rate adjuster 378 is configured to dynamically adjust the rate at which replicated data units 307 are enqueued. Enqueue rate adjuster 378 may do so, for example, by manipulating a register or other appropriate memory structure to change the value of a configuration parameter that affects how frequently traffic manager 370 enqueues replicated data units 307.

For instance, under one operating context, enqueue rate adjuster 378 may cause traffic manager 370 not to limit the rate at which replicated data units 307 are enqueued in egress queues 324, while in another operating context, enqueue rate adjuster 378 may place an absolute limit on the number of enqueues for replicated data units 307 in a given time slot. Or, under one operating context, enqueue rate adjuster 378 may cause traffic manager 370 to guarantee a first number of enqueues for replicated data units 307 in a given time slot, whereas in another operating context, the traffic manager 370 is reconfigured to guarantee only a smaller number of enqueues for replicated data units 307 in a given time slot.

According to an embodiment, enqueue rate adjuster 378 is configured to adjust the enqueue rate for replicated data units 307 based on a measure of how much buffer space in buffers 330 (e.g. number of entries, amount of memory, etc.) is utilized by data belonging to garbage collection lists. The measure of buffer space so consumed may be tracked, for instance, by buffer accounting mechanism 340. Enqueue rate adjuster 378 may periodically or at other intervals read this amount and adjust the enqueue rate based thereon.

For instance, enqueue rate adjuster 378 may recalculate the enqueue rate based on a function of the amount of buffer space consumed for garbage collection. Or, enqueue rate adjuster 378 may compare the amount of buffer space consumed for garbage collection to a threshold, and lower (or raise) the enqueue rate to an associated level when the amount of buffer space so consumed rises (or lowers) beyond that threshold. Any number of thresholds and associated levels may exist. In yet other embodiments, other measures may be utilized to determine when and/or how to adjust the enqueue rate, such as a measure of the amount of multiple-destination data units (e.g. in terms of cells or packets) enqueued in the egress queues and/or the replication queues, or total amount of buffer space consumed thereby. Any function of one or more of such measures may also be used.

In an embodiment, the limited rate is merely a limit on the number of enqueues guaranteed for replicated data units 307, while in another embodiment, the limited rate is an absolute limit on the number of enqueues guaranteed for replicated data units 307.

In any event, an effect of the limit may be that the replication queues 364 become oversaturated and begin dropping multi-destination traffic before that traffic hits the replication queues 364. In many cases, an excessive amount of multi-destination traffic may be the culprit behind the increasing amount of buffer space consumed by data belonging to garbage collection lists. That is, the multi-destination traffic is typically more resource-intensive than unicast traffic, and is thus much more likely to be dropped, leaving behind large amounts of data for garbage collection.

Accordingly, by causing certain multi-destination traffic to be dropped earlier than it might otherwise have been dropped (i.e. before hitting the oversaturated replication queues 364), the limited enqueue rate may provide garbage collector 350 with more time to bring garbage collection consumption back down to more acceptable levels. Meanwhile, the increased dropping of multi-destination traffic units may signal congestion to a sender of the traffic, which may in turn reduce its sending rate, which may likewise assist in reducing the amount of buffer space consumed in system 300 for garbage collection.

In an embodiment, the enqueue rate is limited just for multicast data units. Other types of multi-destination data units 307 may proceed without a rate limitation, or with a different rate limitation. For instance, there may be separate replication queues 364 for multicast data units and other multi-destination data units, and the replication queues 364 may have different enqueue rates (e.g. be scheduled for replication at different rates).

In an embodiment, enqueue rate adjuster 378 may take one or more additional or alternative measures to slow the enqueue rate of multi-destination data units 307. For instance, the enqueue rate adjuster may send a flow control message to one or more senders of the multi-destination data units 307 indicating to pause or slow the rate of sending multi-destination traffic. In other embodiments, the sending of such a message may be an indirect side effect of decreasing the enqueue rate of the replicated data units 307. Because the enqueue rate is being slowed, data units 307 already in the replication queue 364 will sit in buffers 330 for longer, and the amount of buffer space consumed for a given sender will thus increase. A flow control mechanism may be configured to send a flow control message to the given sender in response to observing this increase.

In an embodiment, the enqueue rate adjuster 378 may be configured to adjust the enqueue rate for multi-destination data units 307 in response to triggering events other than those described above.

2.10. High-Priority Multi-Destination Replication

As mentioned, an enqueue rate adjustment scheme such as described above may result in increasing the number of dropped multi-destination data units. For some types of multi-destination data units—usually multicast—increasing the number of dropped data units may be of relatively insignificant consequence. For other types of multi-destination data units—such as mirrored unicast traffic—increasing the number of dropped data units may be highly undesirable.

Figure 4:
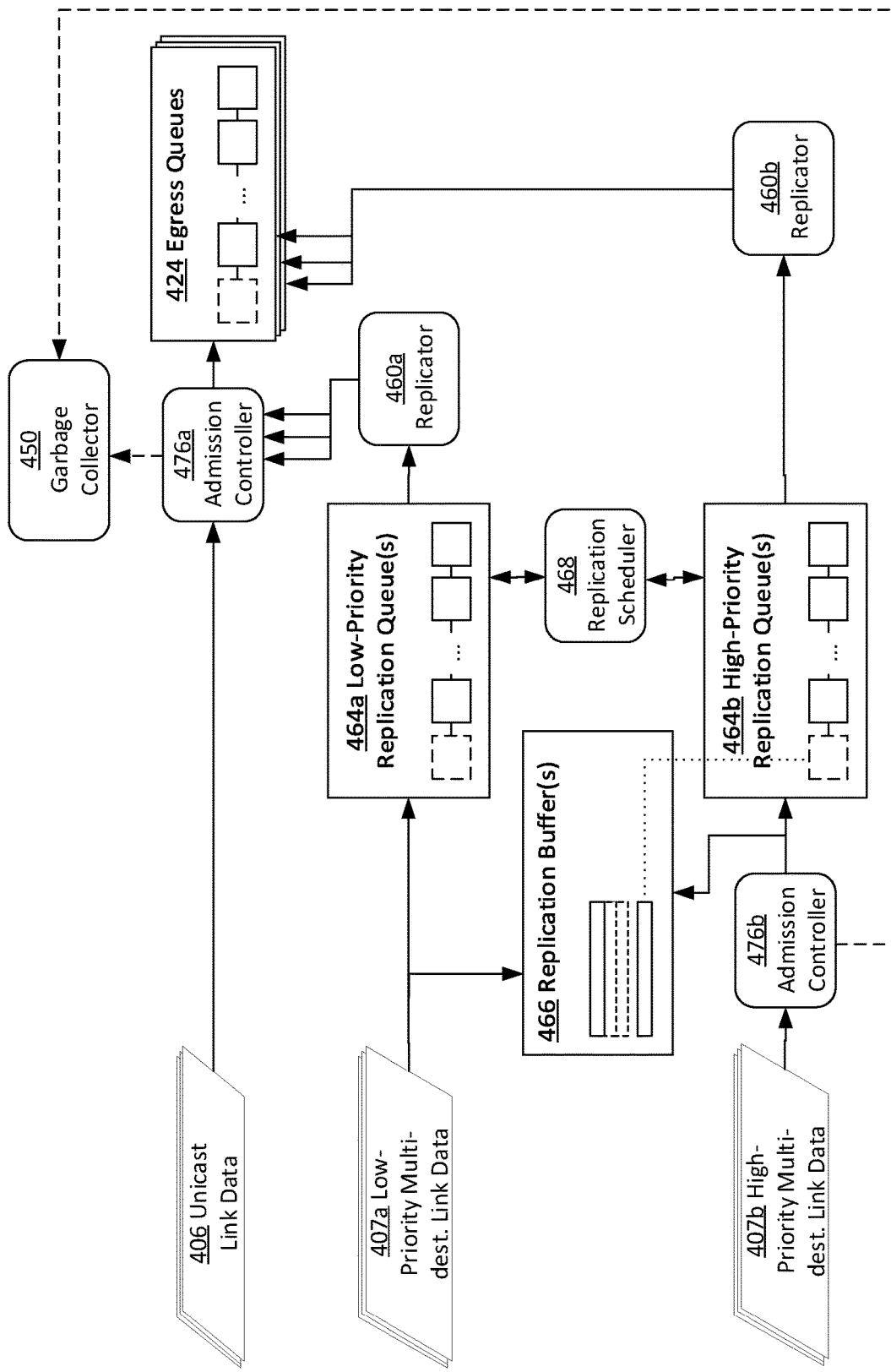
FIG. 4 illustrates an example system in which replication of certain types of multiple-destination data is prioritized to, among other aspects, reduce the impact of enqueue rate adjustment on these types of data.

FIG. 4 illustrates an example system 400 in which replication of certain types of multiple-destination data is prioritized to, among other aspects, reduce the impact of enqueue rate adjustment on these types of data, according to an embodiment. System 400 is implemented using any suitable arrangement of circuitry and/or software. In some embodiments, systems 400 and system 300 are in fact a same system, viewed from different perspectives. For example, the depicted components may be components of, or coupled to, traffic manager 370. In other embodiments, systems 300 and 400 are in fact different systems.

In system 400, multi-destination traffic such as multi-destination data units 307 are classified as being either low-priority multi-destination data units or high-priority multi-destination data units. High-priority data units follow a different path through system 400 than low-priority data units. This arrangement is intended to decrease the likelihood of dropping high-priority data units. Exactly what types of multi-destination data units are considered high-priority versus low-priority varies depending on the embodiment, but in at least one embodiment, all multicast traffic is considered low-priority, while all other types of multi-destination traffic are considered high-priority.

To understand these two paths, it is first helpful to consider the path followed by unicast traffic, such as unicast data units 306. Link data for a unicast data unit, depicted as unicast link data 406, is sent to admission control logic 476a for an egress queue 424 to which the unicast data unit has been assigned. Admission control logic 476a may be, for instance, part of admission controller 376. The admission control logic 476a performed various checks, as described above, to determine whether the unicast data unit may be enqueued. If so, unicast link data 406 is linked to the end of the relevant egress queue 424. Otherwise, the unicast link data 406—or at least relevant portions thereof, is sent to a garbage collector 450 (or a garbage collection list processed thereby) so that the garbage collector 450 can identify and free any buffer entries occupied by the unicast data unit.

Meanwhile, link data for a low-priority multi-destination data unit—referred to as low-priority link data 407a—is placed in a replication buffer 466. From this buffer, the link data 407a is linked to the end of a low-priority replication queue 464a. At a time determined by a replication scheduler 468, this low-priority link data is then sent to a replication component 460a. Using the link data 407a, the replication component identifies each destination queue 424 of the low-priority multi-destination data unit. Using admission control logic 476a, the replicator 460a identifies which destination queue(s) 424 can admit the low-priority multi-destination data unit. To each admitting queue, replicator 460a links a copy of the link data 407a. If there are no admitting queues 424, the link data, or relevant portions thereof, are instead sent to garbage collector 450.

By contrast, link data for a high-priority multi-destination data unit—referred to as high-priority link data 407b—is sent to admission control 476b before ever being linked to a replication queue. Each destination queue 424 of the high-priority multi-destination data unit is identified. For each of these queues 424, the admission control logic 476b—which is similar to or even the same as logic 476a—determines whether the high-priority multi-destination data unit can be enqueued.

If no queue 424 admits the high-priority multi-destination data unit, then link data 407b is sent to garbage collector 450. Otherwise, its link data 407b is buffered in replication buffer 466 and linked to the end of a high-priority replication queue 464b. The place of the high-priority multi-destination data unit in any admitting queue 424 is considered to be reserved, and in fact any relevant counts associated with the queue 424 may be updated to reflect admission of the high-priority multi-destination data unit in the queue 424. However, the high-priority multi-destination data unit is not yet linked to any queue 424, as its link data 407b must be replicated and linked by a replicator 460b at a time selected by replication scheduler 468. Replicator 460b may be the same as, or similar to replicator 460a, except that the results of admission control logic 476b are utilized to determine where to link the replicated link data 407b, without requiring further evaluation by admission control logic 476a.

In an embodiment, one reason for differentiating between multicast multi-destination traffic and non-multicast multi-destination traffic is that the exact number of destinations for the multicast traffic is relatively unpredictable, whereas the exact number of destinations for non-multicast traffic is predictable and much smaller than the number of possible multicast destinations. Hence, whereas admission checks for non-multicast traffic may be accomplished in a predictable amount of time, the same is not true for multicast traffic.

In an embodiment, replication scheduler 468 is configured to schedule releases of data units from high-priority replication queues 464b more frequently than from low-priority replication queue(s) 464a. Any sort of prioritization scheme may be used. For instance, for every low-priority data unit scheduled, two high-priority data units may be scheduled. This ratio may be adjusted over time based on system activity. In an embodiment, an enqueue rate adjustment may be made by changing the frequency with which replication scheduler schedules the release of low-priority and/or high priority data units. In other embodiments, the replication scheduler 468 has no impact of the enqueue rate for multi-destination data units.

2.11. Miscellaneous

System 300 illustrates only one of many possible arrangements of devices configured to provide the functionality described herein. Other arrangements may include fewer, additional, or different components, and the division of work between the components may vary depending on the arrangement. Similarly, FIG. 4 illustrates only one of the many possible arrangements of components configured to optimize the replication and enqueue of multi-destination traffic. Other arrangements may similarly be utilized.

For instance, although only one traffic manager 370 is depicted, system 300 may have any number of traffic managers 370, which may be configured to process various sets of data units 305 in serial or in parallel. Each traffic manager 370 may be coupled to its own buffer set 330, packet processor(s) 320, and other associated components. A separate garbage collector 350 may exist for each buffer set 330, or the same garbage collection logic may be utilized for one or more buffer sets 330.

In an embodiment, certain path selection logic may be delayed for multiple destination data units 307 until after the data units 307 are dequeued from the replication queue 364. For instance, prior to enqueueing a data unit 307 in a replication queue 364, the path selector 374 may simply determine whether the data unit 307 should be placed in a replication queue 364 (and potentially which replication 364 to place the data unit 307). Upon the data unit 307 being dequeued from a replication queue 364, forwarding logic coupled to the replication queue 364 may then determine the exact set of queues 324 to which the data unit 307 should be assigned.

Although traffic manager 370 is given as an example of a component in which the techniques described herein may be practiced, these techniques may equally be practiced in any component that handles the flow of data units to a packet processor 320, whether that packet processor is considered to perform ingress, egress, or other functions. For instance, the techniques may also be practiced in an arbitration component that handles data units 305 destined for ingress processing. Hence, garbage collection steps described herein as being performed by or within a traffic manager should be understood as also be capable of performance within an arbitration component or other component configured to direct traffic to a packet processor.

3.0. Functional Overview

The various elements of the process flows described below may be performed in a variety of systems, including in system 300 described above. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Buffering Packet Data

Figure 5:
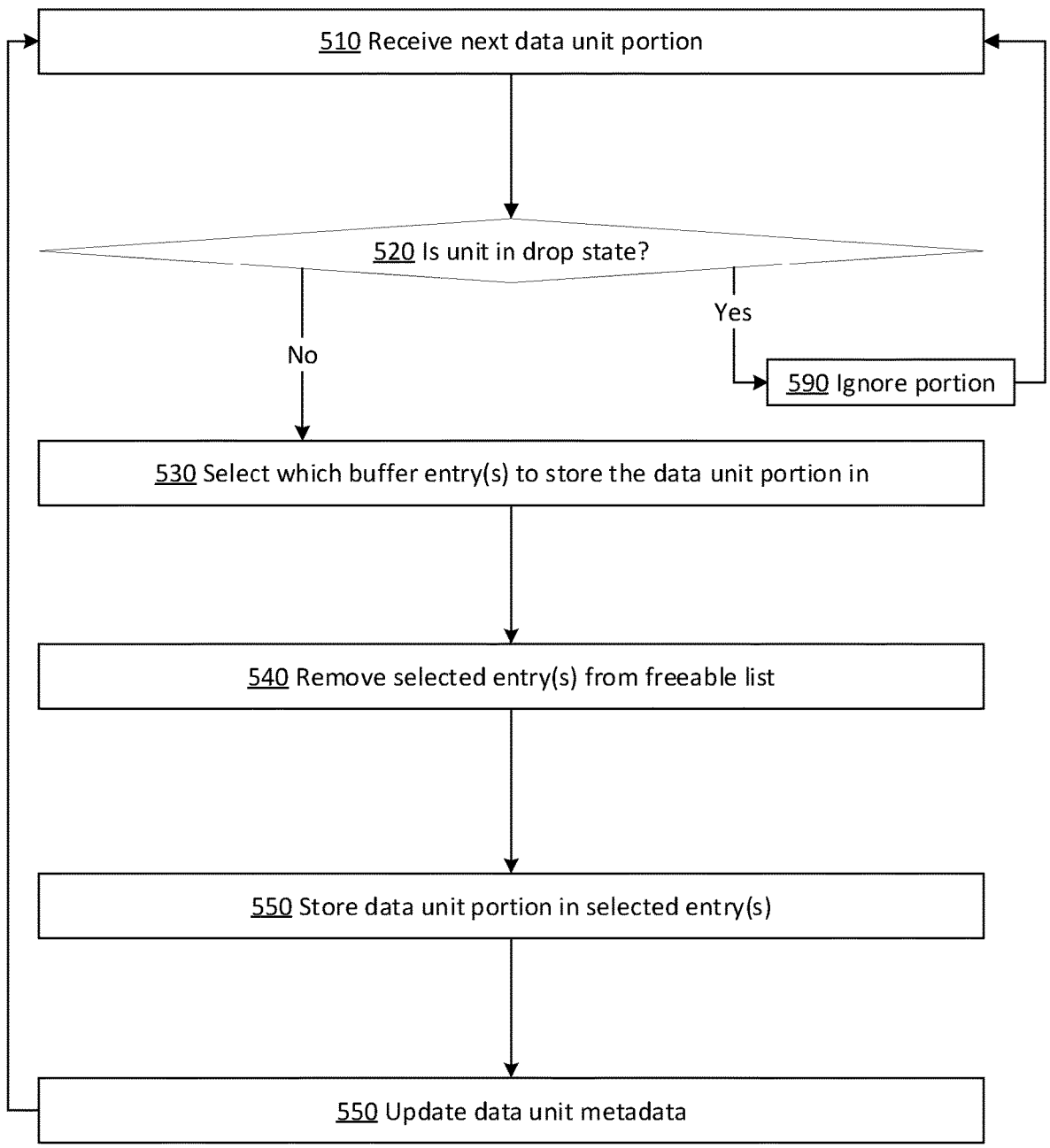
FIG. 5 illustrates an example flow for buffering data units at a component of a network device.

FIG. 5 illustrates an example flow 500 for buffering data units at a component of a network device, according to an embodiment. Flow 500 may be implemented by any component configured to buffer data, but in an embodiment is particularly adapted to buffering by a traffic manager configured to manage the flow of packets through egress packet processors. For instance, flow 500 may be performed by traffic manager 370 while manipulating memory structures such as depicted in FIG. 3 and/or FIG. 4.

Block 510 comprises receiving a next data unit or data unit portion at a component of a network device, such as a traffic manager. Depending on the embodiment, the data unit portion may be an entire packet, a cell or frame of a packet, or any other data unit or subunit thereof. For convenience, the term data unit portion is used to describe the received data, though it will be recognized that the portion may in fact be an entire data unit. The data unit may be received directly via a communication interface, or the received data unit may have been pre-processed by one or more system components disposed between the receiving component and the communication interface.

Block 520 comprises determining whether the data unit is in a drop state from a previous drop event. The data unit may have been dropped for a variety of reasons, such as explained elsewhere herein. Block 520 may require a determination of what data unit the data unit portion belongs to, which may involve identifying a packet sequence number, context identifier, or other identifier associated with the data unit. If the data unit is in a drop state, then flow 500 proceeds to block 590, which involves ignoring the data unit portion and returning to block 510 to receive another data unit. Otherwise, flow 500 proceed to block 530.

Block 530 comprises selecting a buffer entry or entries in which to store the data unit portion. There may be one or more tables, lists, or other structures, commonly referred to as "free lists," indicating which buffer entries in the implementing system's buffers are available to store newly received data unit portions. The entry or entries may be selected from one or more of these free lists. Any of the buffer entries found in such a list are considered "free" or "available," and may be selected to store a new data unit. The mechanism used to select a specific free buffer entry from the free list to store a specific data unit portion may vary depending on the embodiment. For instance, the buffer entry with the lowest or highest address may be selected, or the buffer entry that has been freed the longest may be selected, or a random entry may be selected.

Block 540 comprises removing the selected buffer entry or entries from the free list in which they were found, so that the entry or entries are no longer considered available to store subsequently received data.

Block 550 comprises storing the data unit portion in the selected buffer entry or entries.

Block 560 comprises storing and/or updating metadata for the data unit. Depending on the portion received, this step may involve parsing information from a data unit header and copying that information to a memory in which data unit metadata is found, updating head and/or tail addresses of buffer entries that store data for the data unit, generating intra-packet linking data, if needed, updating buffer count information, and so forth.

From block 560, flow 500 may return to block 510 for buffering of additional data units.

Flow 500 illustrates only one of many possible flows for buffering a data unit. Other flows may include fewer, additional, or different elements, in varying arrangements. For example, block 560 may actually occur before other blocks of flow 500, such as block 530. As another example, block 520 or block 530 may comprise determining whether the data unit passes one or more ingress checks that allow the data unit portion to be buffered. For instance, if buffering the data unit portion would surpass a buffer space quota associated with the data unit, or the data unit has become corrupted, the data unit may be dropped before the data unit portion is buffered.

In an embodiment, flow 500 may be performed for multiple data units at least partially concurrently.

3.2. Responding to a Drop Event

Figure 6:
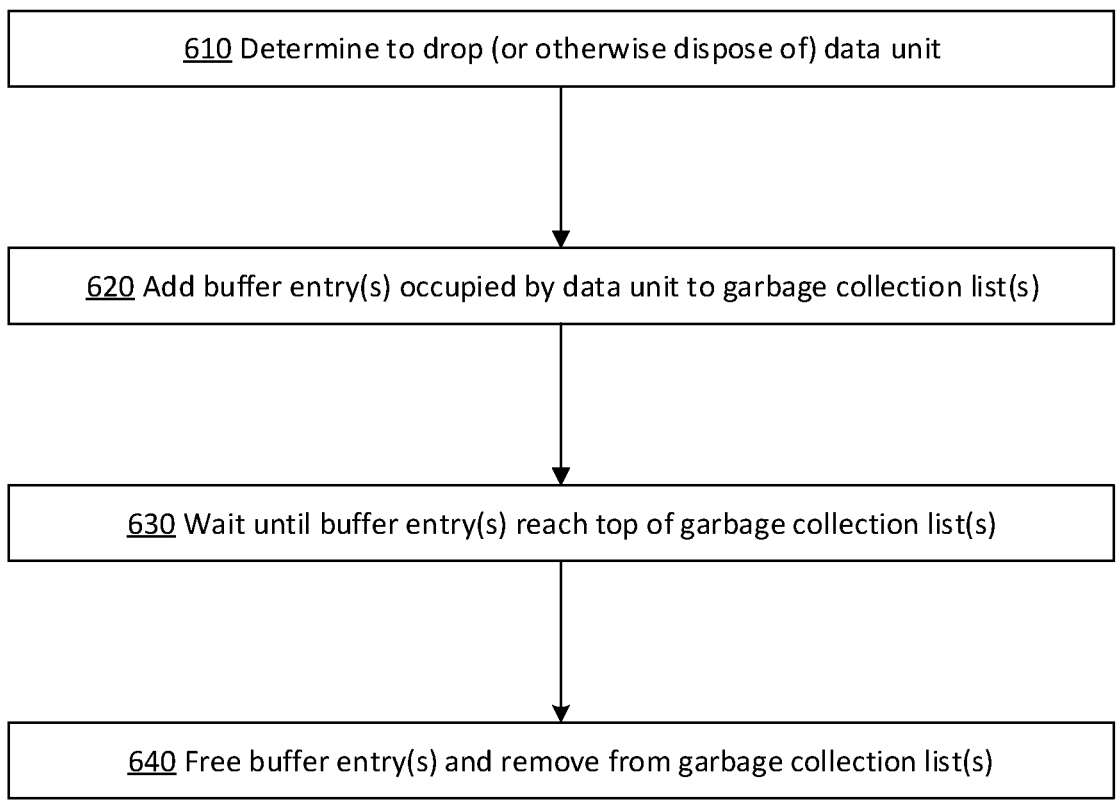
FIG. 6 illustrates an example flow for responding to a dropped data unit.

FIG. 6 illustrates an example flow 600 for responding to a dropped data unit, according to an embodiment. Flow 600 is implemented with respect to memory structures such as generated or manipulated in the process of performing flow 500. Flow 600 may be implemented by one or more components of a network device, such as a traffic manager, packet processor, and/or other suitable component.

Block 610 comprises determining to drop, or otherwise dispose of, a data unit that is already at least partially buffered. Such a determination may occur in response to a variety of different events. For instance, after buffering one or more portions within a data unit, a traffic manager may determine that the data unit is assigned to or associated with a queue or other entity that currently lacks a sufficient allocation of buffer space to store the data unit. Similarly, the traffic manager may determine that an associated entity is in a congested state or other state that restricts its ability to accept the data unit. As yet another example, the traffic manager may determine that the data unit is missing one or more portions. Based on these or similar determinations, the traffic manager may decide to drop the data unit. Such a determination may occur while the data unit is still being received, and/or after a data unit has been received, depending on the embodiment.

Block 620 comprises adding any buffer entries that are occupied by data for the data unit to one or more garbage collection lists. Each entry may be added explicitly, or the heads of one or more chains of entries, described by intra-packet linking data for the data unit, may be added to the one or more garbage collection lists. There may be, in some embodiments, separate garbage collection lists for different garbage collectors, buffers, classes of data, etc. In some embodiments, some of a data unit's buffer entries may be immediately freeable, in which case flow 600 would skip directly to block 640 for these entries.

Block 630 comprises waiting until the buffer entry or entries added in block 620 arrive at the top of the garbage collection list(s), as will happen as the list(s) are operated on over time via multiple iterations of flow 600 for multiple dropped data units. When a buffer entry arrives at the top of a garbage collection list, flow proceeds to block 640.

Block 640 comprises freeing the buffer entry(s) and removing them from the garbage collection list(s). Freeing a buffer entry may comprise a number of steps, depending on the embodiment. For instance, freeing a buffer entry may comprise adding that buffer entry back to a free list. Freeing a buffer entry may further comprise decrementing buffer counters of entities associated with the data unit whose data was stored in the buffer entry.

In an embodiment, freeing a buffer entry may further comprise following link data associated with the buffer entry to locate a next buffer entry that stores data for the data unit. This entry may, in turn, be freed as well, either at the next opportunity for the garbage collector to free an entry, or the next entry may be added to a garbage collection list.

Block 640 may be performed all at once, or over a period of time. For instance, where the garbage collector must follow a chain of entries to locate all of the entries that store data for a data unit, block 640 may require a number of clock cycles or other time slots to perform the necessary memory read operations to follow the chain to each entry. Moreover, where multiple garbage collection lists are used for data from the same data unit, the data unit's data may arrive at the tops of those garbage collection lists at different times, and thus some portions of the data unit may be freed before other portions have arrived at the top of their respective lists. Performance of block 640 may further be scheduled around the availability of memory read operations or other resources, as these resources may often be utilized by other higher-priority system components.

In an embodiment, once the garbage collector begins freeing a chain of entries, it will continue following the chain without interruption, so long as it has access to the necessary resources. In other embodiments, blocks 630 and 640 are performed continuously as the garbage collector follows the chain. Each time a new entry in the chain is located, it is added to the garbage collection list, and waits to arrive at the top of that queue before being freed.

Flow 600 illustrates only one of many possible flows for responding to a drop event. Other flows may include fewer, additional, or different elements, in varying arrangements. Further example details of flow 600 and other garbage collection techniques may be found, without limitation, in the afore-mentioned application entitled "HIGH-PERFORMANCE GARBAGE COLLECTION IN A NETWORK DEVICE."

3.3. Enqueuing Data Units

Figure 7:
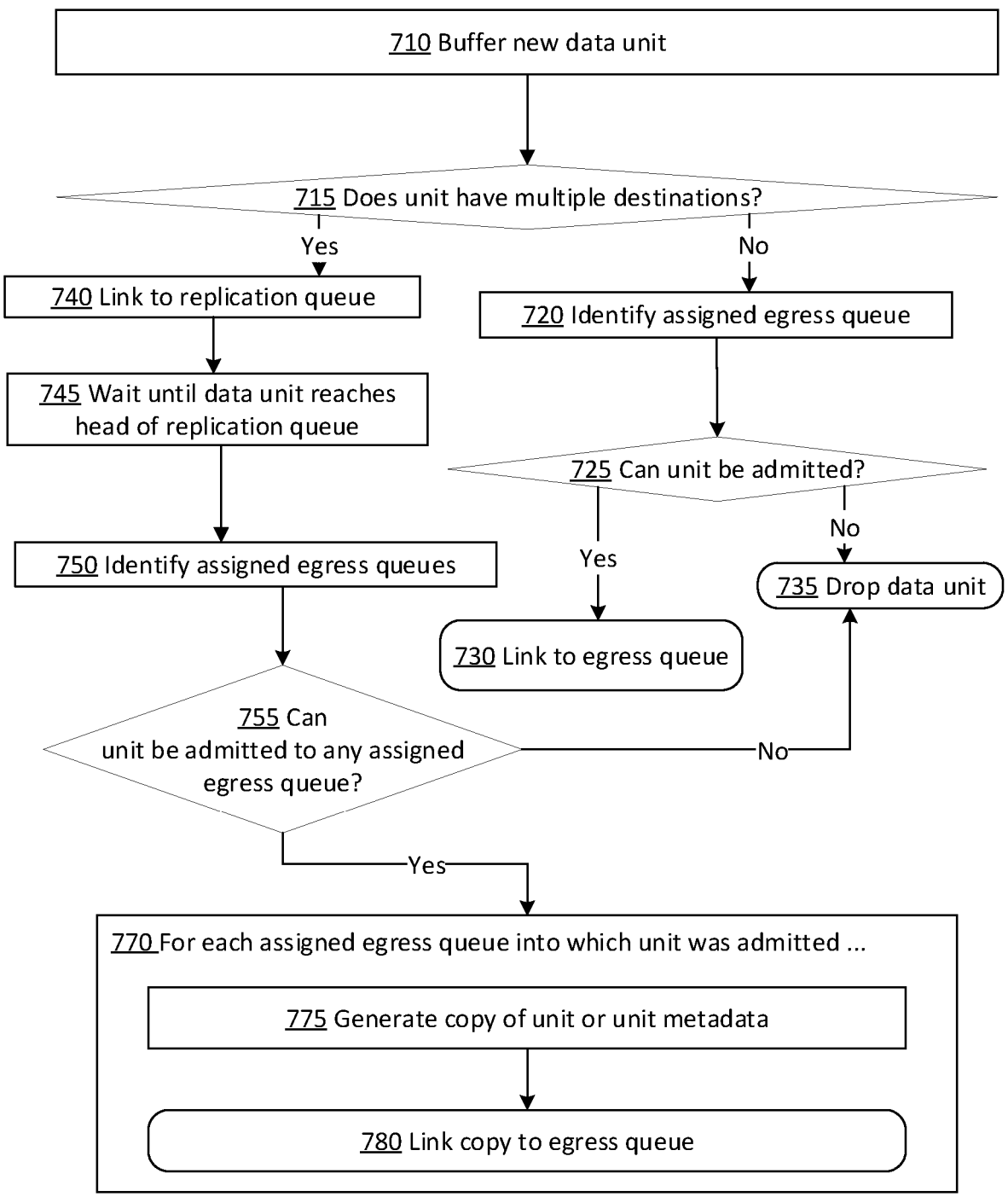
FIG. 7 illustrates an example flow for enqueueing a data unit.

FIG. 7 illustrates an example flow 700 for enqueueing a data unit, such as a packet, according to an embodiment. Flow 700 may likewise be implemented by one or more components of a network device.

Block 710 comprises buffering a new data unit. For instance, block 710 may comprise buffering a newly received data unit using steps of flow 500, or any other suitable buffering technique. Block 710 is considered complete when the entire data unit is buffered.

Block 715 comprises determining whether the data unit has multiple destinations. A data unit may be determined to have multiple destinations for a number of reasons, such as having a multicast address, having an attribute that matches a mirroring policy, having an attribute that matches a policy to send a copy of the data unit to a CPU, or any other suitable reason. Each destination may correspond to a different egress queue and/or a different egress port of the network device.

If the data unit does not have multiple destinations, then flow 700 proceeds to block 720. Block 720 comprises identifying an assigned egress queue for the destination of the data unit. For instance, a path selection process may "resolve" the data unit to an egress queue by looking up forwarding instructions associated with address information or other data unit metadata, such as in a forwarding table or set of rules or policies. The data unit may be assigned to the egress queue indicated by the associated forwarding instructions.

In some embodiments, block 715 and 720 may be performed as part of a same step of assigning an egress queue to the data unit. Rather than explicitly determining how many destinations a data unit has up front, a path selection process may try to resolve the data unit to one or more egress queues. If the data unit resolves to only one egress queue, then the data unit has only a single destination, whereas if the data unit resolves to multiple egress queues, the data unit has multiple destinations.

From block 720, flow 700 proceeds to block 725. Block 725 comprises determining whether the data unit may be admitted into the assigned egress queue. This determination may involve one or more admission checks to verify that admission of the data unit in the assigned queue does not violate any quotas or policies. For instance, there may be an absolute limit on the size of the assigned queue. If the data unit is too large or has too many subunits, this limit may be surpassed. Hence, the data unit will be denied entry in the queue. Similar determinations may be made with respect to restrictions on the number of data units having a certain attribute (e.g. source port, source queue, source address, etc.) in the queue.

Another check may verify that the current rate at which data units having certain attributes are entering the queue does not surpass (or fall below) some threshold limit. Yet another check may verify that the data unit has not been corrupted.

At least some of the admission checks may be performed as the data unit is still being received. For instance, with each new data unit portion that is received, the size of the data unit may be evaluated to determine whether enqueuing the data unit would violate any queue-related quotas that are applicable to the data unit. Other checks may be performed only after the data unit has been received and buffered.

If the data unit can be admitted, then flow 700 proceeds to block 730, which comprises linking the data unit to the assigned egress queue. In an embodiment, this linking comprises copying certain data unit metadata into an "inter-packet" link memory in association with the assigned queue. The metadata may include, for instance, addresses and other information required to subsequently dequeue the packet from an egress queue.

In an embodiment, there may be a restriction on the number of data units that may be enqueued in any given time slot (e.g. a limit on the number of I/O operations on the link memory). Accordingly, enqueuing the data unit per block 730 may be scheduled or otherwise delayed until a time when resources permit enqueuing the data unit.

If the data unit cannot be admitted into the assigned queue, then flow 700 instead proceeds to dropping the data unit in block 735. The dropping may result in sending or linking the data unit to a garbage collection list, so that the buffers occupied by the data unit may be freed, per the steps of flow 600 or any other suitable garbage collection technique.

If a data unit does have multiple destinations, then flow 700 instead proceeds from block 715 to block 745. Since the data unit may have many destinations and must undergo replication for each of these destinations, and since there may be a limit on the number of data units that may be linked to an egress queue in a given time slot, the replication and enqueueing of a multi-destination data unit must be appropriately scheduled, particularly when there may be a number of other multi-destination data units already waiting for replication and enqueueing.

Block 740 therefore comprises linking the data unit to a replication queue, comprising data units waiting for replication and enqueueing. As with block 730, the linking operation includes storing metadata necessary or subsequently dequeuing the data unit. In an embodiment, this metadata may be buffered temporarily in a replication buffer. Block 745 then comprises waiting for a replication process to dequeue the unit from that replication queue, as resources become available for replication and enqueueing the data unit.

Block 750 comprises identifying the egress queues to which the data unit is assigned, in similar manner to block 720, except that the data unit may resolve to multiple destination queues. As with block 720, block 750 may instead be performed up front, at the same time as block 715.

Block 755 comprises determining whether the data unit can be admitted to any egress queue to which it has been assigned. Block 755 involves, in essence, repeating block 725 for each assigned egress queue. If the data unit is admitted into any egress queue, regardless of the results of the admission checks on other egress queues, flow 700 proceeds to block 770. If the data unit is not admitted to any egress queue, flow 700 proceeds to dropping the data unit, per block 735.

Block 770 comprises replicating and enqueueing the data unit for each assigned egress queue into which the data unit was admitted. Block 770 comprises two substeps, illustrated as blocks 775 and 780. Block 775 comprises replicating the data unit, which involves either generating a copy of the data unit itself, or generating a copy of metadata for the data unit. Block 780 comprises linking that copy to the egress queue, in similar manner to block 730.

In an embodiment, there is a defined enqueue rate that limits the number of data units for which block 770 is performed over a given period of time. Example techniques for controlling the enqueue rate are described elsewhere herein.

In an embodiment, there is also or instead a limit on the total number of egress queue enqueues that may occur in a given time period. That is, the total number of data units that may be enqueued in blocks 730 and 780 in aggregate may be limited. Different rules may be applied to determine how to allocate enqueues between multiple destination data units (per block 775) and single destination data units (per block 730). For instance, single destination data units may be enqueued without delay, while multiple destination data units may be enqueued during a given time slot only to the extent that doing so does not surpass the aggregate limit.

To support the above-described enqueue rate and/or aggregate enqueue limit, both block 730 and block 780 may include a substep of waiting for an available enqueue time, which time may be determined using rules such as just explained. Note that this delay may impact the rate at which other blocks in flow 700 are performed for subsequent data units, as they await for resources to become available for egress queue enqueue operations.

Because a single multiple destination data unit may be enqueued into any number of egress queues, and because the number of enqueues in a given time slot may be limited, it may actually take any number of time slots (e.g. clock cycles) to dequeue a single multiple destination data unit.

Flow 700 illustrates only one of many possible flows for enqueuing a data unit. Other flows may include fewer, additional, or different elements, in varying arrangements. In an embodiment, for example, block 755 may also be performed up front for certain types of multi-destination traffic with predictable numbers of destinations, as described in other sections. Moreover, a data unit may be dropped at varying other times during the course of flow 700, such as if a replication queue or buffer has no room to store the data unit, or if the data unit cannot be resolved to any queue. There may also be other alternative branches of flow 700 for other differentiating characteristics of a data unit.

3.4. Enqueue Rate Adjustment

Figure 8:
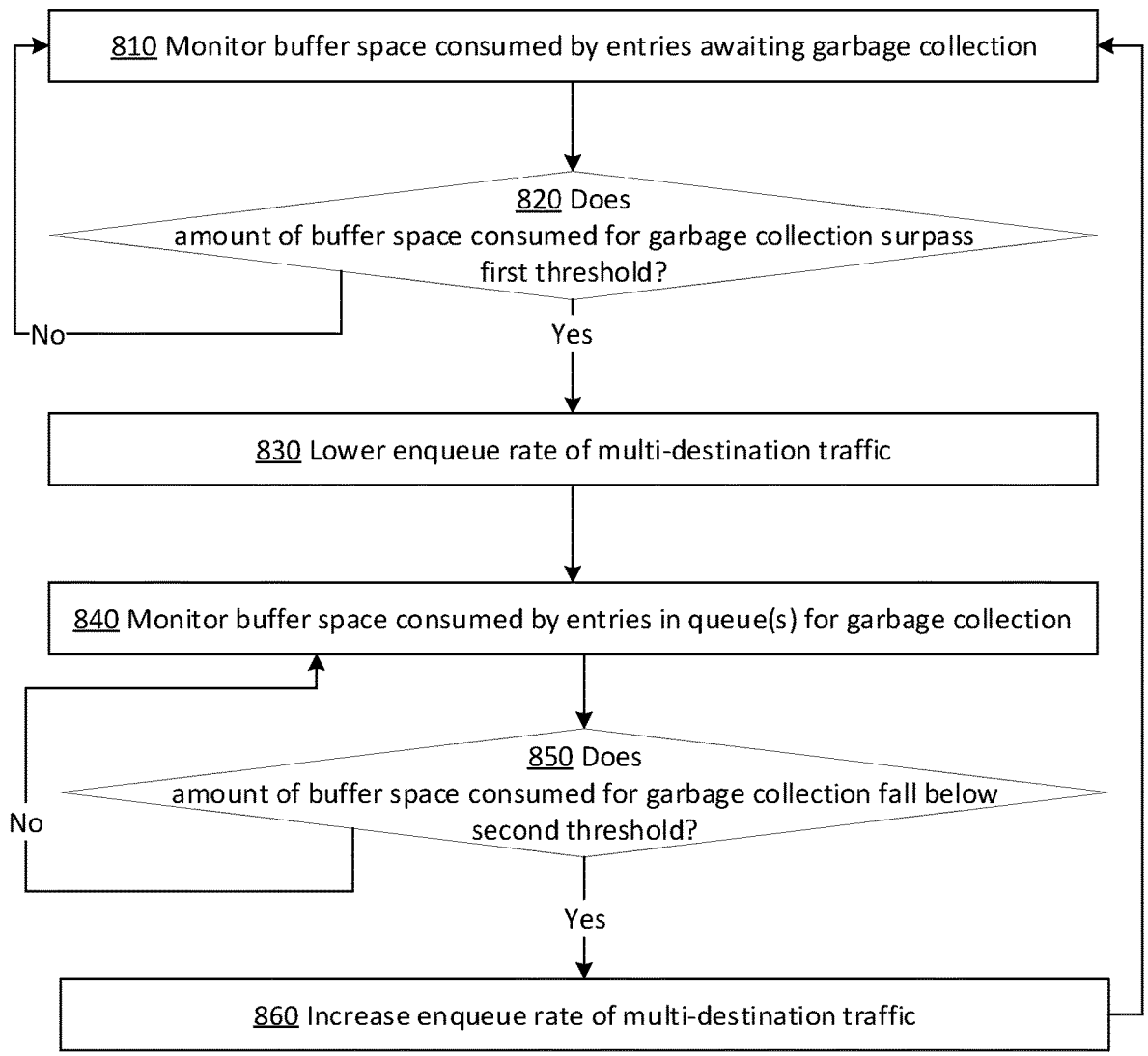
FIG. 8 illustrates an example flow for adjusting the enqueue rate of multi-destination network traffic.

FIG. 8 illustrates an example flow 800 for adjusting the enqueue rate of multi-destination network traffic, according to an embodiment. Flow 800 may likewise be implemented by one or more components of a network device.

Block 810 comprises monitoring the amount of buffer space consumed by entries waiting for garbage collection. Generally, the amount of buffer space consumed is some measure of how much buffer space in the one or more buffer memories is currently queued for garbage collection. For instance, a buffer accounting mechanism may monitor the number of buffer entries in a set of buffers that have been added to garbage collection lists, but not yet freed. These buffer entries may be entries that store data for data units that have been dropped or otherwise disposed of. For instance, the entries may have been added to a garbage collection list per block 620 of flow 600, but not yet freed per block 640.

The count may be maintained in a number of manners. For instance, as a data unit is disposed of, the total measure of buffer entries used by the data unit may be added to a measure of buffer entries in the garbage collection list(s). As each buffer entry is freed, this count is diminished appropriately.

As another example, the length of each garbage collection list may be summed together to calculate the number of buffer entries in the garbage collection list(s). If some nodes of the garbage collection list(s) correspond to chains of entries instead of single entries, this sum may not be an entirely accurate count of buffer entries consumed for garbage collection, but in some embodiments is still a useful measure for the purposes of flow 800. In yet other embodiments, the number of data units that have not been completely freed is tracked instead, and that number is decremented once the end-of-packet portion of a data unit is reached.

Block 820 comprises determining whether the amount of buffer space consumed for garbage collection surpasses a first threshold. For instance, the network device may be configured such that, when more than twenty-five percent of a set of buffer memories is consumed for garbage collection (i.e. by buffer entries storing data that has been linked to garbage collection list(s)), certain actions may be taken. Hence, the first threshold may correspond to twenty-five percent of the total number of buffer entries.

This first threshold may, in some embodiments, be user-configurable. Moreover, the threshold may be adjusted over time based on network conditions.

If the first threshold is not surpassed, flow 800 returns to block 810 for continued monitoring. Otherwise, flow 800 proceeds to block 830.

Block 830 comprises lowering the enqueue rate for multi-destination traffic. In some embodiments, lowering the enqueue rate comprises transitioning from an unlimited enqueue rate to a limited rate. In other embodiments, lowering the enqueue rate comprises transitioning between a higher limited rate to a lower limited rate.

Lowering the enqueue rate may comprise different actions depending on the embodiment. For example, lowering the enqueue rate may comprise setting a maximum number of multi-destination data units that may be replicated and/or enqueued in a given time slot. The lowered enqueue rate may, for instance, allow only one replicated data unit to be enqueued per clock cycle, per every other clock cycle, or per some other unit of time.

As another example, the enqueue rate may correspond to the number of guaranteed enqueues for multi-destination data units during a given time slot. In time slots where more enqueues are available (i.e. not in use for unicast data units), this enqueue rate may be surpassed.

In an embodiment, lowering the enqueue rate may increase the amount of time a multi-destination data unit takes to go through a replication queue and/or waits for the purposes of block 745. In an embodiment, other actions may also or instead be taken to lower the rate at which multi-destination data units are enqueued, such as sending a message to a sender that pauses or reduces a send rate for multi-destination data streams.

Block 840 comprises continuing to monitor the amount of buffer space consumed by entries in queues for garbage collection, in the same manner as described for block 810. In an embodiment, the frequency of the monitoring may optionally increase or decrease for block 840.

Block 850 comprises determining whether the amount of buffer space consumed for garbage collection falls below a second threshold. The second threshold and the first threshold may be a same threshold. Or, the second threshold may be a lower threshold than the first threshold, so as to prevent repeated transitions between enqueue rates over a relatively short period of time as the amount of space consumed for garbage collection straddles the first threshold.

If the amount of buffer space consumed does not fall below the second threshold, flow 800 returns to block 840 for continued monitoring. Otherwise, flow 800 proceeds to block 860.

Block 860 comprises increasing the enqueue rate of the multi-destination traffic back to its previous level.

Flow 800 illustrates only one of many possible flows for adjusting an enqueue rate. Other flows may include fewer, additional, or different elements, in varying arrangements. For instance, there may be more than one threshold level, corresponding to more than one enqueue rate. There may, for instance, a first enqueue rate used for normal operating conditions, a second enqueue rate used when the amount of buffer space consumed for garbage collection surpasses a first threshold, and a third enqueue rate used when the amount of buffer space consumed for garbage collection surpasses a second threshold. In another embodiment, the enqueue rate is calculated as a function of the amount of buffer space consumed for garbage collection.

In an embodiment, other measures may be utilized to determine when to adjust the enqueue rate, instead of or in addition to buffer space consumption. Such measures may include, for instance, the total amount of buffer space used for multiple destination data units (or a certain class thereof) or the total number of multiple destination data units (or a certain class thereof) that have been enqueued in the egress queues and/or replication queues. These measures may be used alone or in combination with garbage control buffer space consumption. In an embodiment, ranges for some or all of these measures may be mapped to enqueue rates or enqueue rate reduction amounts using an enqueue rate policy table. The enqueue rate adjuster may look up the current values for these measures in the policy table to determine a current enqueue rate.

In an embodiment, the adjusted enqueue rate is used for only certain types of multi-destination traffic, such as for multicast data units only.

3.5. Optimizing Handling of High-Priority Multi-Destination Traffic

Figure 9:
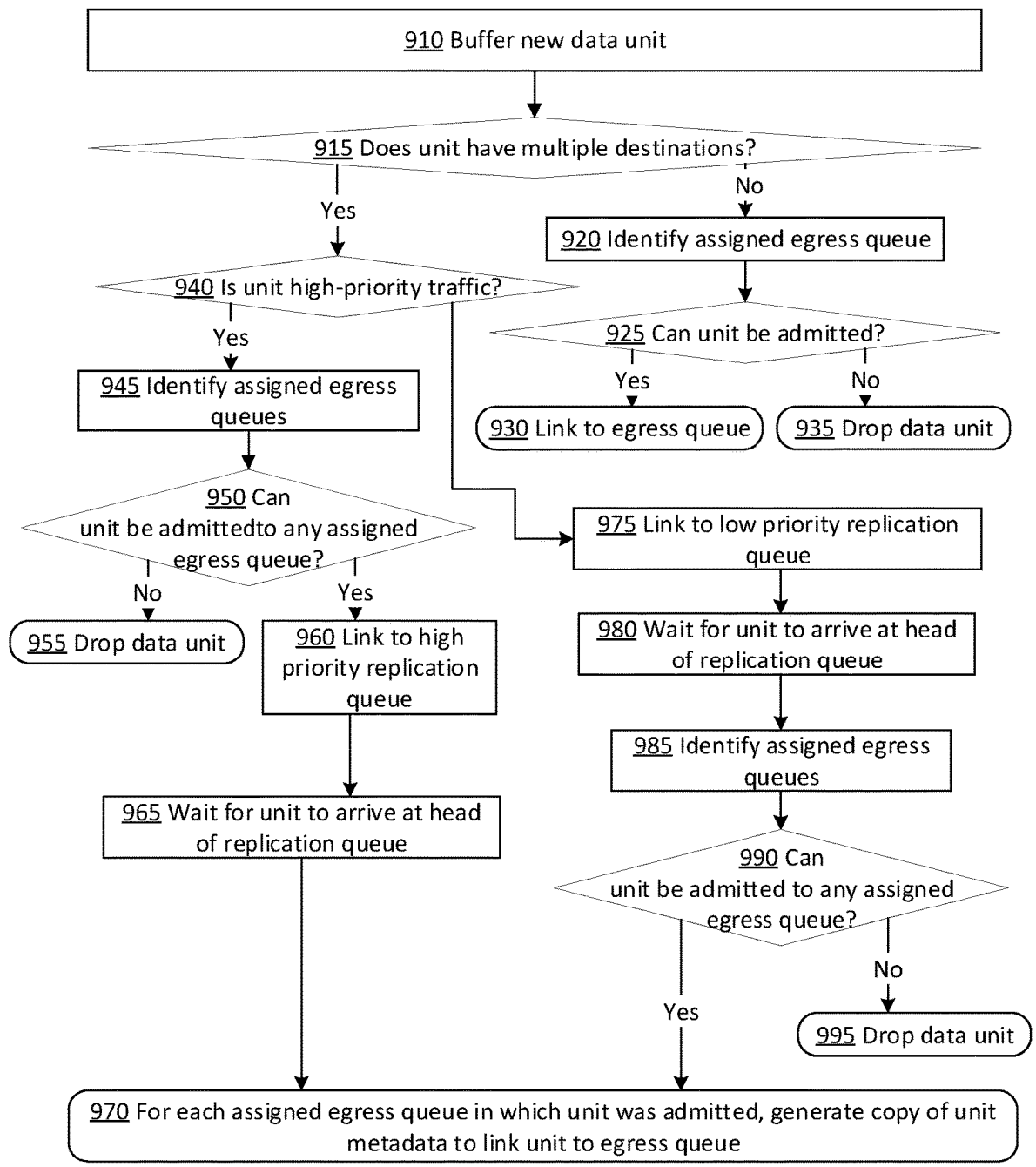
FIG. 9 illustrates an example flow for enqueueing a data unit, in which the handling of higher-priority multi-destination traffic is optimized.

FIG. 9 illustrates an example flow 900 for enqueueing a data unit, in which the handling of higher-priority multi-destination traffic is optimized, according to an embodiment. Flow 900 may likewise be implemented by one or more components of a network device. In an embodiment, flow 900 is a more detailed view of flow 700.

Blocks 910-935 proceed in the same manner as blocks 710-735.

However, if in block 915 it is determined that the data unit does have multiple destinations, then flow 900 instead proceeds to block 940. Block 940 comprises determining whether the data unit is a high-priority data unit. In an embodiment, a multi-destination data unit is a high-priority data unit so long as the data unit is not a multicast data unit. In other embodiments, various attributes of a data unit may also or instead be used to determine whether the data unit is a high-priority data unit.

For high-priority data units, flow 900 proceeds to block 945. Block 945 comprises identifying the queues to which the data unit is assigned. Block 945 proceeds in similar manner to block 750 of FIG. 7. For instance, a data unit may be assigned to a queue associated with its destination address and one or more queues associated with mirror destinations defined by a mirroring policy. Or, as another example, a data unit may be assigned to a queue associated with its specified destination and one or more additional processing components for analytical or debugging operations.

Block 950 comprises determining whether the data unit can be admitted to any assigned egress queue. In essence, block 950 involves performing admission checks for these assigned queues up front, instead of after passing through replication queues. These admission checks may proceed in similar manner to those of block 755. If no queue admits the data unit, then flow 900 proceeds to block 955, which drops the data unit before it is linked to any replication queue.

On the other hand, if even one of the assigned queues admits the data unit, then the data unit is linked to a high-priority replication queue in block 960, regardless of whether the data unit is admitted into any other assigned queue. Once linked to a high-priority replication queue, the data unit's place in the assigned queues to which it was admitted is reserved, and the data unit can no longer be dropped.

Block 965 comprises waiting for the data unit to arrive at the head of the high-priority replication queue. Because the replication queue to which the data unit is assigned is treated as a high-priority queue, the replication queue may be processed more frequently than other replication queues. Hence, a data unit may spend a shorter time queued for replication than data units in lower-priority replication queues.

Eventually, the data unit's turn to be released from the head of the replication queue arrives. The release of the data unit may be scheduled for instance, by a replication scheduler. When this happens, then in block 970, the data unit is replicated and linked to one or more egress queues. More specifically, for each assigned egress queue into which the unit was admitted, a copy of the data unit or its linking metadata is generated. This copy is then linked to the end of the egress queue.

Returning to block 940, if the data unit is not high-priority traffic, then flow 900 proceeds to block 975. Block 975 comprises linking the data unit to a low-priority replication queue. Unlike a high-priority data unit, a low-priority data unit is linked to the replication queue without performing any admission checks.

Block 980 comprises waiting for the data unit to arrive at the head of the low-priority replication queue. The low-priority replication queue is processed less frequently than the high-priority replication queue. Consequently, all things being equal, lower-priority data units will wait longer for replication than higher priority data units.

Block 985 comprises, upon reaching the data unit's turn to be released from the head of the low-priority replication queue, identifying the egress queues to which the data unit is assigned, in similar manner to block 945.

Block 990 comprises determining whether the data unit can be admitted to any assigned egress queue, in similar manner to block 950. In essence, block 990 involves performing admission checks for these assigned egress queues after passing through the replication queues. If no egress queue admits the data unit, then flow 900 proceeds to block 995, which drops the data unit. On the other hand, if even one of the assigned queues admits the data unit, then flow 900 proceeds to block 970, which has already been described above.

Flow 900 illustrates only one of many possible flows for enqueuing a data unit. Other flows may include fewer, additional, or different elements, in varying arrangements. For instance, in an embodiment, there may be more than two levels of priority for the multi-destination data units, each corresponding to a different set of replication queues. Each level may have its own replication/enqueue rate. On the other hand, in some embodiments, there may be no difference in priority between replication queues—the different types of multi-destination data units are differentiated in processing solely in the timing of their respective admission checks. In yet other embodiments, admission checks are always performed after passing through a replication queue, and the different types of multi-destination data units are differentiated in processing solely in the rates at which their respective replication queues are processed.

Other embodiments may include yet other steps, such as buffering link data in a replication buffer, performing ingress checks before placing units in replication buffers, dropping data units that cannot fit in replication buffers, and so forth. Moreover, the time at which the assigned egress queues are identified may vary depending on the embodiment.

In an embodiment, multicast data units may also be mirrored and/or sent to a central processing unit. The handling of these units may be different than depicted in FIG. 9. Mirror copy destinations for the multicast data unit may be resolved up front, so that the admission checks may be performed in advance. If any mirror copy passes its admission checks, the data unit will not be linked to garbage collection. If all mirror copies fail admission checks, the multicast copy may be linked to a replication queue and processed normally.

4.0. Example Embodiments

Examples of some embodiments are represented, without limitation, in the following clauses:

According to an embodiment, a system comprises: one or more buffer memories configured to temporarily store contents of data units received over a plurality of network interfaces; one or more packet processors configured to forward at least some of the data units to destinations in an order indicated by egress queues, the data units including unicast data units that the one or more packet processors are configured to forward to single destinations and multi-destination data units that the one or more packet processors are configured to forward to multiple destinations; queueing logic configured to enqueue buffered data units into particular egress queues, of the egress queues, to which the buffered data units have been assigned; enqueue rate adjustment logic configured to reduce an enqueue rate at which the queueing logic enqueues at least certain types of the multi-destination data units, based on an increase in a measure of at least one of: how much buffer space in the one or more buffer memories is currently queued for garbage collection, how much buffer space in the one or more buffer memories is currently utilized to store multi-destination data units, or an amount of multi-destination data units enqueued in one or more queues.

In an embodiment, the measure is the amount of multi-destination data units enqueued in the one or more queues, wherein the one or more queues are the egress queues, wherein the amount corresponds to a number of packets, cells, or bytes in the multi-destination data units enqueued in the egress queues.

In an embodiment, the measure is of how much buffer space in the one or more buffer memories is currently queued for garbage collection, the measure being a total count of buffer entries that are queued for garbage collection, a physical size of the buffer entries that are queued for garbage collection, a number of data units having at least some data that is queued for garbage collection, or a number of buffer entry chains that are queued for garbage collection.

In an embodiment, the at least certain types of the multi-destination data units includes only multicast data units.

In an embodiment, the system further comprises: one or more replication queues; wherein the queueing logic is configured to enqueue multi-destination data units to the one or more replication queues before enqueueing the multi-destination data units to the egress queues; replication logic configured to replicate multi-destination data units, in an order indicated by the one or more replication queues, the replicated multi-destination data units then being enqueued into the particular egress queues to which the replicated multi-destination data units have been assigned.

In an embodiment, the measure is the amount of multi-destination data units enqueued in the one or more queues, wherein the one or more queues are the one or more replication queues, wherein the amount corresponds to a number of packets, cells, or bytes in the multi-destination data units enqueued in the egress queues.

In an embodiment, replicating the multi-destination data units comprises replicating link data by which the contents of the multi-destination data units are locatable in the one or more buffer memories, wherein enqueueing the replicated multi-destination data units comprises linking the replicated link data to the particular egress queues.

In an embodiment, the queueing logic is configured to enqueue unicast data units directly to the particular egress queues to which the unicast data units are assigned, without enqueueing the unicast data units to the one or more replication queues.

In an embodiment, the queueing logic is further configured to drop certain multi-destination data units associated with a particular replication queue of the one or more replication queues when the particular replication queue is over a threshold size.

In an embodiment, the system further comprises: admission control logic configured to perform one or more admission checks on the buffered data units before the buffered data units are enqueued into the particular egress queues to which the buffered data units are assigned, wherein the buffered data units that are enqueued into the egress queues are only those buffered data units that pass the one or more admission checks, wherein data units that fail the one or more admission checks are dropped; wherein, for high-priority multi-destination data units, the admission control logic is deployed before the high-priority multi-destination data units are enqueued into the one or more replication queues; wherein, for low-priority multi-destination data units, the admission control logic is deployed after the low-priority multi-destination data units are released from the one or more replication queues.

In an embodiment, the low-priority multi-destination data units are multicast data units, wherein high-priority multi-destination data units include mirrored data units.

In an embodiment, the system further comprises admission control logic configured to perform one or more admission checks on low-priority multi-destination data units before the low-priority multi-destination data units are enqueued into the one or more replication queues, the one or more admission checks including determining that a particular replication queue into which a particular low-priority data unit is to be enqueued is not greater than a threshold size, wherein the low-priority multi-destination data units that are enqueued into the one or more replication queues are only those low-priority multi-destination data units that pass the one or more admission checks, wherein low-priority multi-destination data units that fail the one or more admission checks are dropped.

In an embodiment, the admission control logic is also configured to perform the one or more admission checks on high-priority multi-destination data units before the high-priority multi-destination data units are enqueued into the one or more replication queues.

In an embodiment, the system further comprises: a replication scheduler configured to determine when to release data units from the one or more replication queues to the replication logic, the replication scheduler configured to schedule data units from the first replication queues to be released more frequently than data units from the second replication queues.

In an embodiment, adjusting the enqueue rate comprises lowering the enqueue rate in response to detecting that the measure of how much buffer space in the one or more buffer memories is currently queued for garbage collection has surpassed a first threshold.

In an embodiment, adjusting the enqueue rate further comprises raising the enqueue rate in response to detecting that the measure of how much buffer space in the one or more buffer memories is currently queued for garbage collection has fallen below a second threshold.

In an embodiment, the second threshold is the same as or lower than the first threshold.

In an embodiment, lowering the enqueue rate comprises enforcing an enqueue rate limit, wherein no enqueue rate limit was enforced prior to the lowering.

In an embodiment, the system further comprises a flow control mechanism configured to, responsive to the detecting that the measure of how much buffer space in the one or more buffer memories is currently queued for garbage collection has surpassed a first threshold, send a message to a sending device to pause or lower a send rate of particular multi-destination traffic.

In an embodiment, the system further comprises: traffic management logic configured to drop certain data units that are at least partially buffered in the one or more buffer memories, based on rules associated with at least one of: attributes of the certain data units, an accounting of space utilized for certain purposes within the one or more buffer memories, sizes of the egress queues, sizes of replication queues for replicating the multi-destination data units, or fill levels of replication buffers associated with the replication queues; wherein dropping a data unit comprises adding buffer entries associated with the data unit to one or more garbage collection lists.

In an embodiment, the system further comprises: one or more garbage collection lists indicating previously utilized buffer entries, in the one or more buffer memories, that are awaiting garbage collection; a garbage collector configured to free the previously utilized buffer entries to store contents of newly received data units, in an order indicated by the one or more garbage collection lists.

In an embodiment, the system further comprises an accounting mechanism configured to determine the measure of how much buffer space in the one or more buffer memories is currently queued for garbage collection, based on the one or more garbage collection lists.

In an embodiment, the system is a network switch or router.

In an embodiment, the data units are packets and the one or more buffer memories comprise buffer entries that store individual cells or frames of the packets.

In an embodiment, the system is implemented as a Field-Programmable Gate Array or Application-Specific Integrated Circuit.

In an embodiment, each of the egress queues corresponds to a single destination, the unicast data units being assigned to only a single egress queue, the multi-destination data units being assigned to more than one of the egress queues.

In an embodiment, forwarding a first data unit comprises sending the first data unit to an external destination device out a particular communication interface associated with that external destination device, wherein forwarding a second data unit comprises sending the second data unit to an internal central processing unit.

According to an embodiment, a method comprises: receiving data units over a plurality of network interfaces; temporarily buffering the received data units in one or more buffer memories; forwarding at least some of the data units to destinations in an order indicated by egress queues, the data units including unicast data units forwarded to single destinations and multi-destination data units forwarded to multiple destinations; enqueuing buffered data units into particular egress queues, of the egress queues, to which the buffered data units have been assigned; reducing an enqueue rate at which at least certain types of the multi-destination data units are enqueued into the particular egress queues to which the multi-destination data units are assigned, based on an increase in a measure of at least one of: how much buffer space in the one or more buffer memories is currently queued for garbage collection, how much buffer space in the one or more buffer memories is currently utilized to store multi-destination data units, or an amount of multi-destination data units enqueued in one or more queues.

In an embodiment, the at least certain types of the multi-destination data units includes only multicast data units.

In an embodiment, the method further comprises: enqueueing multi-destination data units to the one or more replication queues before enqueueing the multi-destination data units in the egress queues; replicating the multi-destination data units, in an order indicated by the one or more replication queues, the replicated multi-destination data units then being enqueued into the particular egress queues to which the replicated multi-destination data units have been assigned.

In an embodiment, the method further comprises: dropping certain multi-destination data units associated with a particular replication queue of the one or more replication queues when the particular replication queue is over a threshold size.

In an embodiment, the method further comprises: performing one or more admission checks on the buffered data units before the buffered data units are enqueued into the particular egress queues to which the buffered data units are assigned, wherein the buffered data units that are enqueued into the egress queues are only those buffered data units that pass the one or more admission checks, wherein data units that fail the one or more admission checks are dropped; wherein, for high-priority multi-destination data units, the one or more admission checks are performed before the high-priority multi-destination data units are enqueued into the one or more replication queues; wherein, for low-priority multi-destination data units, the one or more admission checks are performed after the low-priority multi-destination data units are released from the one or more replication queues.

In an embodiment, the method further comprises: performing one or more admission checks on low-priority multi-destination data units before the low-priority multi-destination data units are enqueued into the one or more replication queues, the one or more admission checks including determining that a particular replication queue into which a particular low-priority data unit is to be enqueued is not greater than a threshold size, wherein the low-priority multi-destination data units that are enqueued into the one or more replication queues are only those low-priority multi-destination data units that pass the one or more admission checks, wherein low-priority multi-destination data units that fail the one or more admission checks are dropped.

In an embodiment, the method further comprises: determining when to release data units from the one or more replication queues to the replication logic; scheduling data units from first replication queues to be released more frequently than data units from second replication queues.

In an embodiment, adjusting the enqueue rate comprises lowering the enqueue rate in response to detecting that the measure of how much buffer space in the one or more buffer memories is currently queued for garbage collection has surpassed a first threshold.

In an embodiment, the method further comprises, responsive to the detecting that the measure of how much buffer space in the one or more buffer memories is currently queued for garbage collection has surpassed a first threshold, sending a message to a sending device to pause or lower a send rate of particular multi-destination traffic.

In an embodiment, the method further comprises: dropping certain data units that are at least partially buffered in the one or more buffer memories, based on rules associated with at least one of: attributes of the certain data units, an accounting of space utilized for certain purposes within the one or more buffer memories, sizes of the egress queues, sizes of replication queues for replicating the multi-destination data units, or fill levels of replication buffers associated with the replication queues; wherein dropping a data unit comprises adding buffer entries associated with the data unit to the one or more garbage collection lists.

In an embodiment, the method further comprises: utilizing one or more garbage collection lists to track buffer entries, in the one or more buffer memories, that are awaiting garbage collection; freeing the previously utilized buffer entries to store contents of newly received data units, in an order indicated by the one or more garbage collection lists.

Other examples of these and other embodiments are found throughout this disclosure.

5.0. Example Implementing System

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

In an embodiment, some or all of nodes 110 may include a system 300 and/or 400. In an embodiment, some or all of the nodes 110 may implement flows 500-900, regardless of whether the nodes 110 include all of the components of system 300 and/or 400. In other embodiments, however, the techniques described herein may be practiced without all of the details of FIG. 1.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

5.1. NETWORK PACKETS

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit 110 will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

5.2. Network Paths

Any node in the depicted network 100 may communicate with any other node in the network 100 by sending packets through a series of nodes 110 and links, referred to as a path. For example, Node B (110*b*) may send packets to Node H (110*h*) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

5.3. Network Device

Figure 2:
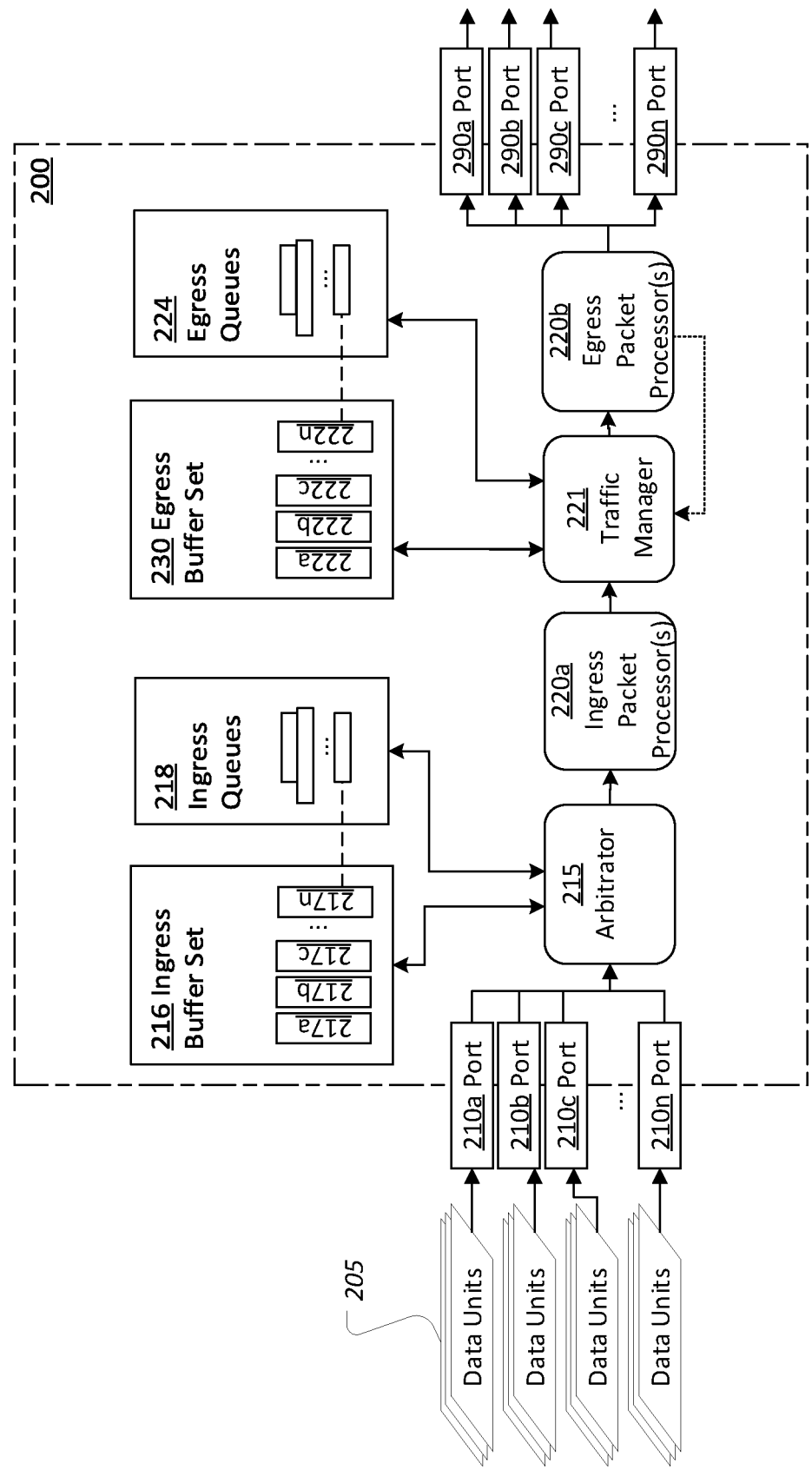
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

In another embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 200.

5.4. Ports

Network device 200 includes ports 210/290. Ports 210, including ports 210*a-n*, are inbound ("ingress") ports by which data units 205 are received over a network, such as network 110. Ports 290, including ports 290*a-n*, are outbound ("egress") ports by which at least some of the packets 205 are sent out to other destinations within the network, after having been processed by the network device 200.

Data units 205 may be packets, cells, frames, or other suitable structures. In many embodiments, the individual atomic data units 205 upon which the depicted components typically operate are cells or frames. That is, data units are received, acted upon, and transmitted at the cell or frame level. These cells or frames are logically linked together as the packets to which they respectively belong for purposes of determining how to handle the cells or frames. However, the cells or frames may not actually be assembled into packets within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 220*a*. On the other end, an egress packet processor 220*b* may input data units serially into another SerDes block, which outputs the data units in parallel to ports 290. There may be any number of input and output SerDes blocks, of any suitable size, depending on the specific implementation (e.g. four groups of 4×25 gigabit blocks, eight groups of 4×100 gigabit blocks, etc.).

5.5. Packet Processors

A device 200 comprises one or more packet processing components 220, such as the depicted ingress packet processor 220*a* and egress packet processor 220*b*, that collectively implement forwarding logic by which the device 200 is configured to determine how to handle each packet the device 200 receives. These packet processors 220 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 220 may be configured to perform different packet processing tasks. For instance, some packet processors may forward data units 205 out egress ports 290, other packet processors 220 may implement flow control mechanisms, other packet processors 220 may perform statistical collection or debugging tasks, and so forth. A device 200 may comprise any number of packet processors 220 configured to perform any number of processing tasks.

In an embodiment, the packet processors 220 of a device 200 are arranged such that the output of one packet processor 220 is, eventually, input into another processor 220, in such a manner as to pass data units 205 from certain packet processor(s) 220 to other packet processor(s) 220 in a sequence of stages, until finally disposing of the data units 205 (e.g. by sending the out an egress port 290, "dropping" packets, etc.). The exact set and/or sequence of packet processors 220 that process a given data unit 205 may vary, in some embodiments, depending on the attributes of the data unit 205 and/or the state of the device 200.

Ingress and Egress Processors

In an embodiment, a packet processor 220 may be generally classified as an ingress packet processor 220a or an egress packet processor 220b. Generally speaking, an ingress packet processor 220a performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of packets, making initial categorizations of packets, and so forth. In an embodiment, there may be fewer ingress packet processors 220a relative to egress packet processor(s) 220b, or even just one ingress packet processor 220a.

The egress packet processor(s) 220b of a device 200, by contrast, are configured to perform all non-intake tasks necessary to implement the forwarding logic of the device 200. These tasks may include, for example, tasks such as identifying paths along which to forward packets, implementing flow control and/or other policies, manipulating packets, performing statistical or debugging operations, and so forth. In an embodiment, there may be different egress packet processors(s) 220b assigned to different flows or other categories of traffic, such that not all data units 205 will be processed by the same egress packet processor 220b.

In an embodiment, multiple egress packet processor(s) 220b may be chained together such that a data unit 205 processed by a first egress packet processor 220b is later processed by a second egress packet processor 220b configured to send the data unit 205 out a specific port 290. There is no limit to the number of packet processor(s) 220b within such a chain.

Forwarding Logic and Tables

As mentioned, the packet processors 220 collectively implement the forwarding logic of a device 200. The forwarding logic of a device 200, or portions thereof, may, in some instances, be hard-coded into the packet processors 220. For instance, the device 200 may be configured to always react to certain types of data units in certain circumstances in a certain way. The forwarding logic, or portions thereof, may also be configurable, in that the logic changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 210 through which the data unit was received, a tag or label in a packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 200 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

5.6. Buffers

Since not all data units 205 received by the device 200 can be processed by the packet processor(s) 220 at the same time, various components of device 200 may temporarily store data units 205 in memory structures referred to as buffers while the data units 205 are waiting to be processed. For example, a certain packet processor 220 may only be capable of processing a certain number of data units 205, or portions of data units 205, in a given clock cycle, meaning that other data units 205, or portions of data units 205, must either be ignored (i.e. dropped) or stored. At any given time, a large number of data units 205 may be stored in the buffers of the device 200, depending on network traffic conditions.

Each buffer may be a portion of any type of memory, including volatile memory and/or non-volatile memory. In an embodiment, each buffer is a distinct single-ported memory, supporting only a single input/output (I/O) operation per clock cycle (i.e. either a single read operation or a single write operation). Single-ported memories may be utilized for higher operating frequency, though in other embodiments multi-ported memories may be used instead. In an embodiment, each of these buffers is capable of being accessed concurrently with each other buffer in a same clock cycle, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which data units 205, or portions thereof, may be stored.

A device 200 may include a variety of buffers or sets of buffers, each utilized for varying purposes and/or components. Generally, a data unit awaiting processing by a component is held in a buffer associated with that component until it is "released" to the component for processing.

A component that utilizes one or more buffers may include a buffer manager configured to manage use of those buffer(s). Among other processing tasks, the buffer manager may, for example, allocate and deallocate specific segments of memory for buffers, create and delete buffers within that memory, identify available buffer entries in which to store a data unit 205, maintain a mapping of buffers entries to data units 205 stored in those buffers entries (e.g. by a packet sequence number assigned to each packet when the first the first data unit 205 in that packet was received), mark a buffer entry as available when a data unit 205 stored in that buffer is dropped, sent, or released from the buffer, determine when a data unit must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer should be utilized to store a given data unit 205, or portion thereof. In some embodiments, each packet is stored in a single entry within its assigned buffer. In yet other embodiments, a packet is received as, or divided into, constituent data units such as fixed-size cells or frames. The buffers may store these constituent data units separately (e.g. not in the same location, or even the same buffer).

In some embodiments, the buffer assignment logic is relatively simple, in that data units are assigned to buffers randomly or using a round-robin approach. In some embodiments, data units 205 are assigned at least partially based on characteristics of those data units 205, such as corresponding traffic flows, destination addresses, source addresses, ingress ports, and/or other metadata. For example, different buffers or sets of buffers may be utilized to store data units received from different ports or sets of ports. In an embodiment, the buffer assignment logic also or instead utilizes buffer state information, such as utilization metrics, to determine which buffer to assign to a data unit. Other assignment considerations may include buffer assignment rules (e.g. no writing two consecutive cells from the same packet to the same buffer) and I/O scheduling conflicts (e.g. to avoid assigning a data unit to a buffer when there are no available write operations to that buffer on account of other components reading content already in the buffer).

5.7. Queues

In an embodiment, to manage the order in which data units 205 are processed from the buffers, various components of a device 200 may implement queueing logic. Each data unit 205, or the buffer locations(s) in which it is stored, is said to belong to one or more constructs referred to as queues. Typically, a queue is a set of memory locations (i.e. in the buffers) arranged in some order by metadata describing the queue. The memory locations may (and often are) non-contiguous relative to their addressing scheme and/or physical arrangement. For example, the metadata for one queue may indicate that the queue is comprised of, in order, entries 1, 50, 3, and 92 in a certain buffer.

The sequence in which the queue arranges its constituent data units 205 generally corresponds to the order in which the data units 205 in the queue will be released and processed. In some embodiments, the number of data units 205 assigned to a given queue at a given time may be limited, either globally or on a per-queue basis, and this limit may change over time.

5.8. Egress Traffic Management

According to an embodiment, a device 200 includes one or more traffic managers 221 configured to control the flow of data units from the ingress packet processor(s) 220*a* to the egress packet processor(s) 220*b*. Device 200 may include egress buffers 222, depicted in FIG. 2 as individual buffers 222*a-n*, which collectively form an egress buffer memory 230. A buffer manager within the traffic manager 221 may temporarily stores data units 205 in buffers 222 as they await processing by egress processor(s) 220b. The number of egress buffers 222 may vary depending on the embodiment. In an embodiment, the traffic manager 221 is coupled to the ingress packet processor(s) 220a, such that data units 205 (or portions thereof) are assigned to buffers 222 only upon being initially processed by an ingress packet processor 220a. Once in an egress buffer 222, a data unit 205 (or portion thereof) may be "released" to one or more egress packet processor(s) 220b for processing, either by the traffic manager 224 sending a link or other suitable addressing information for the corresponding buffer 222 to the egress packet processor 220b, or by sending the data unit 205 directly.

Beyond managing the use of buffers 222 to store data units 205 (or copies thereof), the traffic manager 221 may include queueing logic configured to assign buffer entries to queues 224 and manage the flow of data units 205 through the queues 224. The traffic manager 221 may, for instance, identify a specific queue 224 to assign a data unit 205 to upon ingress of the data unit 205. The traffic manager 221 may further determine when to release—also referred to as "dequeuing"—data units 205 (or portions thereof) from queues 224 and provide that data to specific packet processor(s) 220. The traffic manager 221 may further "deallocate" entries in buffer 222 that are no longer being utilized when the data stored within those entries are dequeued from their respective queues. These entries are then reclaimed for use in storing new data through a garbage collection process.

In an embodiment, different queues 224 may exist for different destinations. For example, each port 210 and/or port 290 may have its own set of queues 224. The queue 224 to which a data unit 205 is assigned may, for instance, be selected based on forwarding information indicating which port 290 the packet should depart from. In an embodiment, a different packet processor 220b may be associated with each different set of one or more queues 224. In an embodiment, the current processing context of the data unit 205 may be used to select which queue 224 a data unit 205 should be assigned to.

In an embodiment, there may also or instead be different queues 224 for different flows or sets of flows. That is, each identifiable traffic flow or group of traffic flows is assigned its own set of queues 224 to which its data units 205 are respectively assigned. In an embodiment, different queues 224 may correspond to different classes of traffic or quality-of-service (QoS) levels. Different queues 224 may also or instead exist for any other suitable distinguishing property of the data units 205, such as source address, destination address, packet type, and so forth.

For instance, a data unit 205 may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one packet processor 220b and a single traffic manager 221 are depicted, a device 200 may comprise any number of packet processors 220b and traffic managers 221. For instance, different sets of ports 210 and/or ports 290 may have their own traffic manager 221 and packet processors 220. As another example, in an embodiment, the traffic manager 221 may be duplicated for some or all of the stages of processing a data unit. For example, system 200 may include a traffic manager 221 and egress packet processor 220b for an egress stage performed upon the data unit 205 exiting the system 200, and/or a traffic manager 221 and packet processor 220 for any number of intermediate stages. The data unit 205 may thus pass through any number of traffic managers 221 and/or egress packet processors 220b prior to exiting the system 200. In other embodiments, only a single traffic manager 221 is needed. If intermediate processing is needed, flow of a data unit 205 may "loop back" to the traffic manager 221 for buffering and/or queuing after each stage of intermediate processing.

An example flow of a data unit 205 through device 200 is as follows. The data unit 205 may be received by a port 210. The data unit 205 is then processed by an ingress packet processor 220a, and then delivered to a traffic manager 221. Traffic manager 221 stores the data unit 205 in a buffer 222 and assigns the data unit 205 to a queue 224. Traffic manager 221 manages the flow of the data unit 205 through the queue 224 until the data unit 205 is released to an egress packet processor 220b. Depending on the processing, the traffic manager 221 may then assign the data unit 205 to another queue 224 so that it may be processed by yet another processor 220, or the packet processor 220b may send the data unit 205 out another port 290.

In the course of processing a data unit 205, a device 200 may replicate a data unit 205 one or more times. For example, a data unit 205 may be replicated for purposes such as multicasting, mirroring, debugging, and so forth. Thus, a single data unit 205 may be replicated to multiple queues 224. Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 222, or a single copy of the data unit 205 may be linked from a single buffer location 222 to multiple queues 224 at the same time.

5.9. Arbitrator

According to embodiments, system 200 further includes one or more arbitration components, or arbitrators, 215, deployed in front of ingress processor(s) 220a. Arbitrator 215 is coupled to an ingress buffer memory 216 comprising ingress buffers 217a-n (collectively ingress buffers 217). Arbitrator 215 may utilize buffers 217 to temporarily store incoming data units 205 before sending them to an ingress packet processor 220a. Arbitrator 215 may be configured to always store incoming data units 205 in buffers 217, or only when needed to avoid potential drops at oversaturated downstream components.

Each data unit 205 is stored in one or more entries within one or more buffers 217, which entries are marked as utilized to prevent newly received data units 205 from overwriting data units 205 that are already buffered. After a data unit 205 is released to an ingress processor 220a, the one or more entries in which a data unit 205 is buffered may then marked as available for storing new data units 205.

Buffer memory 216 may be a same or different memory than buffer memory 230. In embodiments where buffer memory 216 and 230 are the same, ingress buffers 217 and egress buffers 222 may be different portions of that same memory, allocated to ingress and egress operations, respectively.

In an embodiment, buffers 217 and 222 may in fact include at least some of the same physical buffers, and be separated only from a logical perspective. In such an embodiment, metadata or internal markings may indicate whether a given individual buffer entry belongs to an ingress buffer 217 or egress buffer 222. To avoid contention when distinguished only in the logical sense, ingress buffers 217 and egress buffers 222 may be allotted a certain number of entries in each of the physical buffers that they share, and the number of entries allotted to a given logical buffer is said to be the size of that logical buffer. In some such embodiments, instead of copying the data unit from an ingress buffer entry to an egress buffer entry as it transitions through system 200, the data unit may remain in the same buffer entry, and the designation of the buffer entry (e.g. as belonging to an ingress queue versus an egress queue) changes with the stage of processing.

Arbitrator 215 may release a center number of data units from buffers 217 to ingress packet processor(s) 220a each clock cycle or other defined period of time. The next entry to release may be identified using one or more ingress queues 218. For instance, each ingress port 210 or group of ports 210 may be assigned an ingress queue 218. Ingress queues 218 may be, for example, first-in-first-out queues. That is, when deciding which data unit 205 in a queue 218 to release next, the data unit that has been in the queue 218/buffers 217 the longest is selected.

In embodiments with multiple queues 218, a variety of mechanisms may be utilized to identify the next queue 218 from which to release a data unit 205. For example, each queue 218 may be assigned one or more slots each clock cycle (or other defined time period), and the next queue 218 may be selected using a round-robin approach that rotates through these slots. As another example, the next queue 218 may be selected using a random, or probabilistic approach. In an embodiment, each queue 218 may be weighted by an advertised transmission rate. For instance, for every one packet released from a queue 218 for a 100 Mbps port, ten might be released from a queue for a 1 Gbps port. The length and/or average age of a queue 218 might also or instead be utilized to prioritize queue selection. In an embodiment, a downstream component may instruct the arbitrator 215 to release data units from certain ports. Hybrid approaches may be used. For example, one of the longest queues 218 may be selected each odd clock cycle, and a random queue 218 may be selected every even clock cycle. In an embodiment, a token-based mechanism is utilized, as described in other sections.

Yet other queue selection mechanisms are also possible. The techniques described herein are not specific to any one of these mechanisms, unless otherwise stated.

In an embodiment, queues 218 may also or instead exist for specific groups of related traffic, also referred to as priority sets or classes of service. For instance, all data units carrying VoIP traffic might be assigned to a first queue 218, while all data units carrying Storage Area Network ("SAN") traffic might be assigned to a different queue 218. Each of these queues 218 might be weighted differently, so as to prioritize certain types of traffic over other traffic. Moreover, there may be different queues 218 for specific combinations of ports and priority sets.

5.10. Accounting Mechanisms

System 200 includes one or more accounting mechanisms configured to, among other tasks, monitor the use of buffers 217 and/or 222 and generate buffer count information based thereon. The accounting mechanisms maintain counts that indicates the number of buffer entries and/or amount of buffer space utilized by or available to each of a number of defined logical or physical "entities." The entities may include, without limitation, constructs such as ingress ports, ingress queues, priority sets, and/or traffic classes. The buffer count information may be stored in any suitable storage location, and/or communicated to other components periodically or upon request. In an embodiment, such an accounting mechanism is included in or coupled to arbitrator 215, for use in accounting for buffer usage in the ingress buffer set 216. In an embodiment, such an accounting mechanism may also be included in or coupled to the traffic manager 221 for use in accounting for buffer usage in the egress buffer set 230.

In some embodiments, an accounting mechanism that reports the per-entity counts in real-time may be expensive to implement, particularly where many entities are tracked. To reduce the expense of the accounting mechanism, the accounting mechanism may only update count information at intermittent times (e.g. once every ten clock cycles, once every twenty clock cycles, etc.). The accounting mechanism may, for instance, determine and report updated buffer count information for only a small subset of the entities each clock cycle, with the subset being chosen using a round robin approach and/or based on which entities exhibit a high level of recent activity. Alternatively, or additionally, the accounting mechanism may resolve only an approximate utilization for an entity.

5.11. Garbage Collectors

System 200 may include one or more garbage collectors coupled to one or more of the buffer sets 216 and 230. A separate garbage collector may exist for each set of buffers, or a single garbage collector may exist for multiple buffer sets. A garbage collector may, depending on the embodiment, be a distinct system component, or be incorporated into a traffic manager 221, arbitrator 215, and/or other components of system 200.

A garbage collector monitors and frees buffer space that is no longer being utilized. A garbage collector may utilize techniques described herein, as well as potentially other techniques, to perform this function.

5.12. Miscellaneous

System 200 illustrates only one of many possible arrangements of components configured to provide the functionality described herein. Other arrangements may include fewer, additional, or different components, and the division of work between the components may vary depending on the arrangement. For instance, in an embodiment, an ingress processor 220a is omitted and data units 205 are released directly to a traffic manager 221. As another example, there may be any number of traffic managers 221, each with its own set of queues 224 and coupled to its own set of one or more egress processors 220b. In an embodiment, a device may be composed of multiple elements 215, 220, and 221. For instance, multiple ingress processors 220a may connect to multiple traffic managers 221, with each traffic manager 221 connected to one or more egress packet processors 220b.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 10:
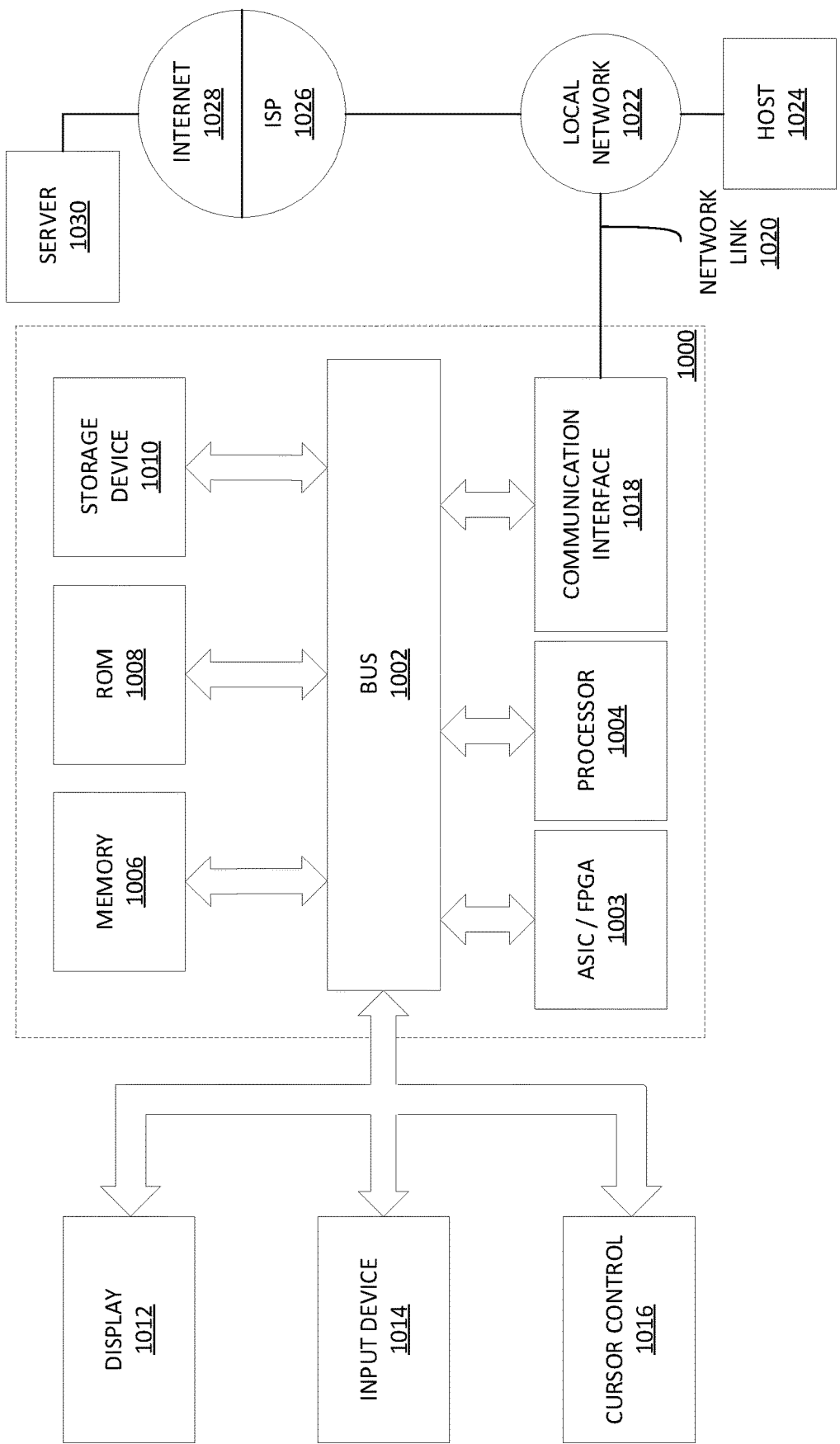
FIG. 10 is block diagram of a computer system upon which embodiments of the inventive subject matter may be implemented.

FIG. 10 is a block diagram that illustrates a computer system 1000 that may be utilized in implementing the above-described techniques, according to an embodiment. Computer system 1000 may be, for example, a desktop computing device, laptop computing device, tablet, smartphone, server appliance, computing mainframe, multimedia device, handheld device, networking apparatus, or any other suitable device. In an embodiment, FIG. 10 and FIG. 3 are both different views of a same networking device.

Computer system 1000 may include one or more ASICs, FPGAs, or other specialized circuitry 1003 for implementing program logic as described herein. For example, circuitry 1003 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 1000 may include one or more hardware processors 1004 configured to execute software-based instructions. Computer system 1000 may also include one or more busses 1002 or other communication mechanism for communicating information. Busses 1002 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1000 also includes one or more memories 1006, such as a RAM, hardware registers, or other dynamic or volatile storage device for storing data units to be processed by the one or more ASICs, FPGAs, or other specialized circuitry 1003. Memory 1006 may also or instead be used for storing information and instructions to be executed by processor 1004. Memory 1006 may be directly connected or embedded within circuitry 1003 or a processor 1004. Or, memory 1006 may be coupled to and accessed via bus 1002. Memory 1006 also may be used for storing temporary variables, data units describing rules or policies, or other intermediate information during execution of program logic or instructions.

Computer system 1000 further includes one or more read only memories (ROM) 1008 or other static storage devices coupled to bus 1002 for storing static information and instructions for processor 1004. One or more storage devices 1010, such as a solid-state drive (SSD), magnetic disk, optical disk, or other suitable non-volatile storage device, may optionally be provided and coupled to bus 1002 for storing information and instructions.

A computer system 1000 may also include, in an embodiment, one or more communication interfaces 1018 coupled to bus 1002. A communication interface 1018 provides a data communication coupling, typically two-way, to a network link 1020 that is connected to a local network 1022. For example, a communication interface 1018 may be an integrated services digital network (ISDN) card, cable modem, satellite modem, or a modem to provide a data communication connection to a corresponding type of telephone line. As another example, the one or more communication interfaces 1018 may include a local area network (LAN) card to provide a data communication connection to a compatible LAN. As yet another example, the one or more communication interfaces 1018 may include a wireless network interface controller, such as a 1002.11-based controller, Bluetooth controller, Long Term Evolution (LTE) modem, and/or other types of wireless interfaces. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by a Service Provider 1026. Service Provider 1026, which may for example be an Internet Service Provider (ISP), in turn provides data communication services through a wide area network, such as the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

In an embodiment, computer system 1000 can send packets and receive data through the network(s), network link 1020, and communication interface 1018. In some embodiments, this data may be data units that the computer system 1000 has been asked to process and, if necessary, redirect to other computer systems via a suitable network link 1020. In other embodiments, this data may be instructions for implementing various processes related to the described techniques. For instance, in the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution. As another example, information received via a network link 1020 may be interpreted and/or processed by a software component of the computer system 1000, such as a web browser, application, or server, which in turn issues instructions based thereon to a processor 1004, possibly via an operating system and/or other intermediate layers of software components.

Computer system 1000 may optionally be coupled via bus 1002 to one or more displays 1012 for presenting information to a computer user. For instance, computer system 1000 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1012 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1012.

One or more input devices 1014 are optionally coupled to bus 1002 for communicating information and command selections to processor 1004. One example of an input device 1014 is a keyboard, including alphanumeric and other keys. Another type of user input device 1014 is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Yet other examples of suitable input devices 1014 include a touch-screen panel affixed to a display 1012, cameras, microphones, accelerometers, motion detectors, and/or other sensors. In an embodiment, a network-based input device 1014 may be utilized. In such an embodiment, user input and/or other information or commands may be relayed via routers and/or switches on a Local Area Network (LAN) or other suitable shared network, or via a peer-to-peer network, from the input device 1014 to a network link 1020 on the computer system 1000.

As discussed, computer system 1000 may implement techniques described herein using customized hard-wired logic, one or more ASICs or FPGAs 1003, firmware and/or program logic, which in combination with the computer system causes or programs computer system 1000 to be a special-purpose machine. According to one embodiment, however, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1000 can receive the data on the network and demodulate the signal to decode the transmitted instructions. Appropriate circuitry can then place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:
1. A system comprising:
 one or more buffer memories configured to temporarily store contents of data units received over a plurality of network interfaces;

one or more packet processors configured to forward at least some of the data units to destinations in an order indicated by egress queues, the data units including unicast data units that the one or more packet processors are configured to forward to single destinations and multi-destination data units that the one or more packet processors are configured to forward to multiple destinations;

queueing logic configured to enqueue buffered data units into particular egress queues, of the egress queues, to which the buffered data units have been assigned;

garbage collection logic configured to perform garbage collection on buffer entries that store contents of data units that have already been disposed of, including freeing the buffer entries to store contents of newly received data units;

enqueue rate adjustment logic configured to adjust an enqueue rate at which the queueing logic enqueues at least certain types of the multi-destination data units, based on a change in a measure of how much buffer space in the one or more buffer memories is currently consumed by buffer entries that store contents of data units that have already been disposed of, but have not yet been freed.

2. The system of claim 1, wherein the at least certain types of the multi-destination data units include only multicast data units.

3. The system of claim 1, further comprising:

one or more replication queues;

wherein the queueing logic is configured to enqueue multi-destination data units to the one or more replication queues before enqueueing the multi-destination data units to the egress queues;

replication logic configured to replicate multi-destination data units, in an order indicated by the one or more replication queues, the replicated multi-destination data units then being enqueued into the particular egress queues to which the replicated multi-destination data units have been assigned.

4. The system of claim 3, wherein the queueing logic is further configured to drop certain multi-destination data units associated with a particular replication queue of the one or more replication queues when the particular replication queue is over a threshold size.

5. The system of claim 3, further comprising:

admission control logic configured to perform one or more admission checks on the buffered data units before the buffered data units are enqueued into the particular egress queues to which the buffered data units are assigned, wherein the buffered data units that are enqueued into the egress queues are only those buffered data units that pass the one or more admission checks, wherein data units that fail the one or more admission checks are dropped;

wherein, for high-priority multi-destination data units, the admission control logic is deployed before the high-priority multi-destination data units are enqueued into the one or more replication queues;

wherein, for low-priority multi-destination data units, the admission control logic is deployed after the low-priority multi-destination data units are released from the one or more replication queues.

6. The system of claim 3, further comprising admission control logic configured to perform one or more admission checks on low-priority multi-destination data units before the low-priority multi-destination data units are enqueued into the one or more replication queues, the one or more admission checks including determining that a particular replication queue into which a particular low-priority data unit is to be enqueued is not greater than a threshold size, wherein the low-priority multi-destination data units that are enqueued into the one or more replication queues are only those low-priority multi-destination data units that pass the one or more admission checks, wherein low-priority multi-destination data units that fail the one or more admission checks are dropped.

7. The system of claim 3, further comprising:

a replication scheduler configured to determine when to release data units from the one or more replication queues to the replication logic, the replication scheduler configured to schedule data units from first replication queues to be released more frequently than data units from second replication queues.

8. The system of claim 1, further comprising a flow control mechanism configured to, responsive to the detecting that the measure has surpassed a first threshold, send a message to a sending device to pause or lower a send rate of particular multi-destination traffic.

9. The system of claim 1, further comprising:

traffic management logic configured to drop certain data units that are at least partially buffered in the one or more buffer memories, based on rules associated with at least one of: attributes of the certain data units, an accounting of space utilized for certain purposes within the one or more buffer memories, sizes of the egress queues, sizes of replication queues for replicating the multi-destination data units, or fill levels of replication buffers associated with the replication queues;

wherein dropping a data unit comprises adding buffer entries associated with the data unit to one or more garbage collection lists.

10. The system of claim 1, further comprising:

one or more garbage collection lists indicating previously utilized buffer entries, in the one or more buffer memories, that are awaiting garbage collection;

wherein the garbage collection logic is configured to performing garbage collection on the previously utilized buffer entries in an order indicated by the one or more garbage collection lists.

11. A method comprising:

receiving data units over a plurality of network interfaces;

temporarily buffering the received data units in one or more buffer memories;

forwarding at least some of the data units to destinations in an order indicated by egress queues, the data units including unicast data units forwarded to single destinations and multi-destination data units forwarded to multiple destinations;

enqueuing buffered data units into particular egress queues, of the egress queues, to which the buffered data units have been assigned;

performing garbage collection on buffer entries that store contents of data units that have already been disposed of, including freeing the buffer entries to store contents of newly received data units;

adjusting an enqueue rate at which at least certain types of the multi-destination data units are enqueued into the particular egress queues to which the multi-destination data units are assigned, based on a change in a measure of how much buffer space in the one or more buffer memories is currently consumed by buffer entries that store contents of data units that have already been disposed of, but have not yet been freed.

12. The method of claim 11, wherein the at least certain types of the multi-destination data units include only multicast data units.

13. The method of claim 11, further comprising:
enqueueing multi-destination data units to one or more replication queues before enqueueing the multi-destination data units in the egress queues;
replicating the multi-destination data units, in an order indicated by the one or more replication queues, the replicated multi-destination data units then being enqueued into the particular egress queues to which the replicated multi-destination data units have been assigned.

14. The method of claim 13, further comprising: dropping certain multi-destination data units associated with a particular replication queue of the one or more replication queues when the particular replication queue is over a threshold size.

15. The method of claim 13, further comprising:
performing one or more admission checks on the buffered data units before the buffered data units are enqueued into the particular egress queues to which the buffered data units are assigned, wherein the buffered data units that are enqueued into the egress queues are only those buffered data units that pass the one or more admission checks, wherein data units that fail the one or more admission checks are dropped;
wherein, for high-priority multi-destination data units, the one or more admission checks are performed before the high-priority multi-destination data units are enqueued into the one or more replication queues;
wherein, for low-priority multi-destination data units, the one or more admission checks are performed after the low-priority multi-destination data units are released from the one or more replication queues.

16. The method of claim 13, further comprising: performing one or more admission checks on low-priority multi-destination data units before the low-priority multi-destination data units are enqueued into the one or more replication queues, the one or more admission checks including determining that a particular replication queue into which a particular low-priority data unit is to be enqueued is not greater than a threshold size, wherein the low-priority multi-destination data units that are enqueued into the one or more replication queues are only those low-priority multi-destination data units that pass the one or more admission checks, wherein low-priority multi-destination data units that fail the one or more admission checks are dropped.

17. The method of claim 13, further comprising:
determining when to release data units from the one or more replication queues to the replication logic;
scheduling data units from first replication queues to be released more frequently than data units from second replication queues.

18. The method of claim 11, further comprising, responsive to the detecting that the measure has surpassed a first threshold, sending a message to a sending device to pause or lower a send rate of particular multi-destination traffic.

19. The method of claim 11, further comprising:
dropping certain data units that are at least partially buffered in the one or more buffer memories, based on rules associated with at least one of: attributes of the certain data units, an accounting of space utilized for certain purposes within the one or more buffer memories, sizes of the egress queues, sizes of replication queues for replicating the multi-destination data units, or fill levels of replication buffers associated with the replication queues;
wherein dropping a data unit comprises adding buffer entries associated with the data unit to the one or more garbage collection lists.

20. The method of claim 11, further comprising:
utilizing one or more garbage collection lists to track buffer entries, in the one or more buffer memories, that are awaiting garbage collection;
performing garbage collection on the previously utilized buffer entries in an order indicated by the one or more garbage collection lists.

21. One or more non-transitory computer-readable media storing instructions that, when executed by one or more computing devices, cause performance of:
receiving data units over a plurality of network interfaces;
temporarily buffering the received data units in one or more buffer memories;
forwarding at least some of the data units to destinations in an order indicated by egress queues, the data units including unicast data units forwarded to single destinations and multi-destination data units forwarded to multiple destinations;
enqueuing buffered data units into particular egress queues, of the egress queues, to which the buffered data units have been assigned;
performing garbage collection on buffer entries that store contents of data units that have already been disposed of, including freeing the buffer entries to store contents of newly received data units;
adjusting an enqueue rate at which at least certain types of the multi-destination data units are enqueued into the particular egress queues to which the multi-destination data units are assigned, based on a change in a measure of how much buffer space in the one or more buffer memories is currently consumed by buffer entries that store contents of data units that have already been disposed of, but have not yet been freed.

22. The one or more non-transitory computer-readable media of claim 21, wherein the instructions, when executed by the one or more computing devices, further cause performance of:
enqueueing multi-destination data units to one or more replication queues before enqueueing the multi-destination data units in the egress queues;
replicating the multi-destination data units, in an order indicated by the one or more replication queues, the replicated multi-destination data units then being enqueued into the particular egress queues to which the replicated multi-destination data units have been assigned;
performing one or more admission checks on the buffered data units before the buffered data units are enqueued into the particular egress queues to which the buffered data units are assigned, wherein the buffered data units that are enqueued into the egress queues are only those buffered data units that pass the one or more admission checks, wherein data units that fail the one or more admission checks are dropped;

wherein, for high-priority multi-destination data units, the one or more admission checks are performed before the high-priority multi-destination data units are enqueued into the one or more replication queues;

wherein, for low-priority multi-destination data units, the one or more admission checks are performed after the low-priority multi-destination data units are released from the one or more replication queues;

determining when to release data units from the one or more replication queues to the replication logic;

scheduling data units from first replication queues that queue high-priority multi-destination data units to be released more frequently than data units from second replication queues that store low-priority multi-destination data units.

23. The one or more non-transitory computer-readable media of claim 21, further comprising, responsive to the detecting that the measure has surpassed a first threshold, sending a message to a sending device to pause or lower a send rate of particular multi-destination traffic.

24. The one or more non-transitory computer-readable media of claim 21, wherein the instructions, when executed by the one or more computing devices, further cause performance of:

dropping certain data units that are at least partially buffered in the one or more buffer memories, based on rules associated with at least one of: attributes of the certain data units, an accounting of space utilized for certain purposes within the one or more buffer memories, sizes of the egress queues, sizes of replication queues for replicating the multi-destination data units, or fill levels of replication buffers associated with the replication queues;

wherein dropping a data unit comprises adding buffer entries associated with the data unit to one or more garbage collection lists;

utilizing the one or more garbage collection lists to track buffer entries, in the one or more buffer memories, that are awaiting garbage collection; and performing garbage collection on the previously utilized buffer entries in an order indicated by the one or more garbage collection lists.

* * * * *